United States Patent
Kobayashi et al.

(10) Patent No.: US 6,780,494 B2
(45) Date of Patent: Aug. 24, 2004

(54) CERAMIC ELECTRONIC DEVICE AND METHOD OF PRODUCTION OF SAME

(75) Inventors: Ryou Kobayashi, Tokyo (JP); Kaname Ueda, Tokyo (JP); Yasushi Izumibe, Tokyo (JP); Hitoshi Ishida, Tokyo (JP); Akira Saitoh, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/377,696

(22) Filed: Mar. 4, 2003

(65) Prior Publication Data

US 2003/0170432 A1 Sep. 11, 2003

(30) Foreign Application Priority Data

Mar. 7, 2002 (JP) ........................................ 2002-062711
Mar. 18, 2002 (JP) ........................................ 2002-075082

(51) Int. Cl.$^7$ ............................... B32B 3/00; H01G 4/06
(52) U.S. Cl. ................ 428/210; 361/321.1; 361/321.2; 361/307
(58) Field of Search ........................... 361/321.1, 321.2, 361/307, 306.3, 312, 313, 320, 321.4, 321.5, 793, 795; 428/210

(56) References Cited

U.S. PATENT DOCUMENTS 5,029,042 A * 7/1991 Dean ........................ 361/321.2
6,507,498 B1 * 1/2003 Klee et al. .................. 361/793
6,514,603 B2 * 2/2003 Chazono ..................... 428/213

FOREIGN PATENT DOCUMENTS

| JP | A 59-228711 | 12/1984 |
|----|-------------|---------|
| JP | A 2-192022 | 7/1990 |
| JP | A 5-101971 | 4/1993 |
| JP | A 7-50223 | 2/1995 |
| JP | A 7-297073 | 11/1995 |
| JP | A 8-37128 | 2/1996 |
| JP | A 11-260665 | 9/1999 |
| JP | A 2001-110664 | 4/2001 |

* cited by examiner

Primary Examiner—Cathy F Lam
(74) Attorney, Agent, or Firm—Oliff & Berridge, PLC

(57) ABSTRACT

A method of production of a ceramic electronic device such as a multilayer ceramic capacitor, comprising forming a first ceramic coating layer on the surface of a substrate, forming an internal electrode on the surface of the first ceramic coating layer, then forming a second ceramic coating layer on the surface of the first ceramic coating layer so as to cover the internal electrode. In this case, when a mean particle size of ceramic particles of the first ceramic coating layer is $\alpha 1$, a thickness of the first ceramic coating layer is T1, a mean particle size of ceramic particles of the second ceramic coating layer is $\alpha 2$, and a thickness of the second ceramic coating layer is T2, the conditions of $\alpha 1 \leq \alpha 2$, $0.05 < \alpha 1 \leq 0.35$ μm, T1<T2, and 0<T1<1.5 μm are satisfied. As a result, it is possible to provide a ceramic electronic device, in particular a multilayer ceramic capacitor, resistant to short-circuit defects, withstand voltage defects, and other structural defects.

9 Claims, 14 Drawing Sheets

CERAMIC ELECTRONIC DEVICE AND METHOD OF PRODUCTION OF SAME

BACKGROUND OF THE INVENTION

1. Field of the Invention

The present invention relates to a ceramic electronic device and a method of production of the same.

2. Description of the Related Art

As one method for producing a capacitor, piezoelectric device, or other ceramic electronic device, there is known the method of forming a ceramic coating in a sheet on a substrate by the doctor blade method to obtain a green sheet and forming electrode paste on top of this by screen printing. In this case, the ceramic coating includes ceramic powder, an organic binder, a plasticizer, a solvent, etc., while the electrode paste includes palladium, silver, nickel, or other conductive particles.

When desiring to obtain a multilayer structure, green sheets formed with the electrode paste layers are stacked to the desired multilayer structure and then cut by a press to obtain ceramic green chips. The thus obtained ceramic green chips are processed to remove the binder, then fired at 1000° C. to 1400° C. Silver, silver-palladium, nickel, copper, or other terminal electrodes are then formed on the obtained fired bodies to obtain the ceramic electronic devices.

In the above method of production, when producing for example a multilayer ceramic capacitor, to reduce the size and increase the capacity, the technique is adopted of reducing the thickness of each ceramic coating layer and increasing the number of layers. For example, multilayer ceramic capacitors are being developed having over 800 ceramic coating layers with thicknesses of about 3 $\mu$m.

In producing a ceramic electronic device such as a multilayer ceramic capacitor, however, when forming an internal electrode, the general practice in the past has been to coat a ceramic coating on the surface of a tape-like substrate having flexibility to form the ceramic coating layer, then print an internal electrode paste. The substrate has been made of polyethylene terephthalate (PET) film etc.

The ceramic coating used is obtained by mixing an acrylic resin or butyral resin or other organic binder, an organic solvent, a plasticizer, and a ceramic powder.

The internal electrode paste is prepared using a resin serving as an organic binder dissolved in an organic solvent as a vehicle, dispersing in the vehicle an Ag, Pd, Ni, Cu, or other conductive metal powder, and, in some cases, adding a diluent for adjusting the viscosity.

As the organic solvent in the vehicle, terpineol, methyl ethyl ketone, etc. is used. As the binder, ethyl cellulose, nitrocellulose, or another cellulose-based resin or butyl methacrylatet methyl methacrylate, or another acrylic-based resin is used. Further, as the diluent, an aromatic hydrocarbon, a fatty acid hydrocarbon, etc. is used.

When printing an internal electrode paste of such a composition on a ceramic coating layer coated on a substrate in accordance with the conventional method of production, however, the terpineol, methyl ethyl ketone, or other organic solvent contained in the internal electrode paste ends up dissolving the acrylic resin, butyral resin, or other organic binder contained in the ceramic coating layer. This phenomenon is called "sheet attack".

If sheet attack occurs, it becomes difficult to peel off the ceramic coating layer from the substrate. Further, sometimes holes or wrinkles occur in the ceramic coating layer. If using such a ceramic coating layer to produce a multilayer ceramic capacitor, short-circuit defects where internal electrodes become connected will arise, withstand voltage defects will arise, the targeted electrostatic capacity will no longer be able to be obtained, or other critical defects are liable to occur.

As a means to avoid this problem, there is the method of printing an internal electrode directly on the substrate, coating a ceramic paste over this to form a ceramic coating layer, then peeling off the ceramic coating layer together with the internal electrode from the surface of the substrate (for example, see Japanese Patent No. 2136761).

With this method, however, the adhesion of the internal electrode and ceramic coating layer with respect to the substrate becomes stronger, so it becomes extremely difficult to peel off the ceramic coating layer without damage (holes, wrinkles, tears, etc.)

It may also be considered to coat the surface of a substrate with an agent for facilitating peeling (hereinafter called a "peeling agent") in advance and form the internal electrode and ceramic coating layer on the surface of the peeling agent. In this case, the difficulty of peeling can probably be avoided.

When printing an internal electrode on the surface of a peeling agent, however, since the affinity between the two is low, the internal electrode is subjected to an agglomerating action due to the surface tension, the shape of the pattern of internal electrode ends up being ruined, and the desired characteristics can no longer be obtained.

SUMMARY OF THE INVENTION

An object of the present invention is to provide a multilayer ceramic capacitor or other ceramic electronic device able to prevent sheet attack and resistant to short-circuit defects, withstand voltage defects, and other structural defects.

Another object of the present invention is to provide a method of production of a high precision, high reliability ceramic electronic device able to remarkably reduce the difficulty in peeling and probability of occurrence of defects in characteristics of the product even if reducing the thickness of the ceramic coating layers.

Still another object of the present invention is to provide a method of production of a ceramic electronic device remarkably reducing step differences between layers due to the electrodes and improving the reliability.

Method of Production and Electronic Device According to First Aspect of Invention To achieve the above objects, a method of production of a ceramic electronic device of a first aspect of the invention comprises the steps of forming a first ceramic coating layer on the surface of a substrate, forming an internal electrode on the surface of the first ceramic coating layer, and forming a second ceramic coating layer on the surface of the first ceramic coating layer so as to cover the internal electrode, wherein, when a mean particle size of ceramic particles of the first ceramic coating layer is $\alpha 1$, a thickness of the first ceramic coating layer is T1, a mean particle size of ceramic particles of the second ceramic layer is $\alpha 2$, and a thickness of the second ceramic layer is T2, the conditions of $\alpha 1 \leq \alpha 2$, $0.05 < \alpha 1 \leq 0.35$ $\mu$m, T1<T2, and 0<T1<1.5 $\mu$m are satisfied.

Preferably, a stack of the first ceramic coating layer, the internal electrode, and the second ceramic coating, layer is peeled from the substrate.

Preferably, a plurality of stacks peeled from the substrate are successively stacked with the first ceramic coating layers and the second ceramic coating layers in contact.

By satisfying $\alpha1 \leq \alpha2$, it is possible to form a dense, high packing density first ceramic coating layer. Therefore, it is possible to avoid to a great extent pinholes in the ceramic layer, withstand voltage defects, and other structural defects of the electronic device.

Further, by satisfying $0.05\ \mu m < \alpha1 \leq 0.35\ \mu m$, it is possible to reduce sheet attack in the production process and reduce the short-circuit defect rate and withstand voltage defect rate. Note that if viewed just from the standpoint of forming a dense, high packing density first ceramic coating layer, a smaller mean particle size $\alpha1$ is better, but if the mean particle size $\alpha1$ becomes smaller than $0.05\ \mu m$, there is a tendency for the dispersibility in the ceramic coating at the time of preparing the ceramic coating to deteriorate and for formation of a uniform ceramic coating layer to become impossible.

Further, by satisfying $T1 < T2$, an increase in thickness due to the thickness $T1$ of the first ceramic coating layer can be avoided and an increase in thickness of the capacity layer, that is, the ceramic layer ($T1+T2$), in for example a multilayer ceramic capacitor can be avoided to a great extent and therefore the acquired capacitance and other electrical characteristics can be secured.

Still further, by satisfying $0\ \mu m < T1 \leq 1.5\ \mu m$, it is possible to reduce the short-circuit defect rate and the withstand voltage defect rate due to sheet attack in the production process. If the thickness $T1$ of the first ceramic coating layer becomes $1.5\ \mu m$ or more, the short-circuit defect rate will be lowered, but there will be a tendency for the withstand voltage defect rate to become higher. The thickness $T1$ is the thickness of the ceramic coating layer before firing. When firing the ceramic body, the thickness of the ceramic coating layer is reduced. Therefore, even after firing, the above thickness condition is always satisfied.

In the method of production according to the present invention, a first ceramic coating layer is formed on the surface of a substrate, an internal electrode is printed on the surface of the first ceramic coating layer, then a second ceramic coating layer is formed on the surface of the substrate so as to cover the internal electrode. Therefore, it is possible to peel off a combined stack of the first ceramic coating layer, internal electrode, and second ceramic coating layer as a unit from the substrate. Accordingly, it is possible to handle these layers etc. as a difficult-to-damage stack and avoid to a great extent delamination, pinholes, withstand voltage defects, and other structural defects due to damage.

Further, since the first ceramic coating layer is formed on the surface of the substrate and then an internal electrode is formed by printing etc. on the surface of the first ceramic coating layer, when peeling the stack off from the substrate, the peeled surface of the first ceramic coating layer becomes a smooth flat surface. Further, the second ceramic coating layer fills the clearances between the predetermined pattern of the internal electrode, so the surface of the second ceramic coating layer also becomes smooth. Therefore, by using this smooth surface as the stacking surface, it is possible to avoid delamination, pinholes, withstand voltage defects, and other structural defects due to step differences.

Further, since the first ceramic coating layer is formed on the surface of the substrate, then the internal electrode is printed on the surface of the first ceramic coating layer, it is possible to coat a peeling agent on the substrate to facilitate the peeling of the first ceramic coating layer. Further, it is possible to reliably peel off even a very thin first ceramic coating layer of several micrometers from the substrate without causing damage, Therefore, it is possible to avoid to a great extent delamination, pinholes, withstand voltage defects, and other structural defects due to damage of the first ceramic coating layer at the time of peeling.

Further, since the internal electrode is formed on the first ceramic coating layer, unlike the case of printing internal electrodes on the surface of a peeling agent, the shape of the internal electrode will not end up being ruined due to the surface tension.

Preferably, the ceramic coating is coated using an extrusion type coating head. The amount of the ceramic coating fed is preferably controlled by a mass flowmeter and a fixed displacement pump. The method of production according to the present invention is particularly suited to a multilayer ceramic capacitor.

Preferably, $\alpha1 < \alpha2$. By making $\alpha1 < \alpha2$, the effects of the present invention are enhanced.

Preferably $T1 + T2 \leq 6\ \mu m$, more preferably $T1 + T2 \leq 4\ \mu m$. By setting such a range, it is possible to reduce the thickness between layers of internal electrodes while maintaining the effects of the present invention and contribute to an improvement in the electrostatic capacitance.

According to the method of production of a ceramic electronic device of the first aspect of the present invention, it is possible to efficiently produce a ceramic electronic device according to the first aspect of the present invention.

A ceramic electronic device according to the first aspect of the present invention has a ceramic body comprised of ceramic layers stacked together and a plurality of internal electrodes stacked inside the ceramic body via the ceramic layers, wherein at least one of the ceramic layers present between pairs of adjoining of internal electrodes is a multilayer structure of a first ceramic layer and a second ceramic layer and wherein, when the mean particle size of ceramic particles of the first ceramic layer is $\alpha1$, a thickness of the first ceramic layer is $T1$, a mean particle size of ceramic particles of the second ceramic layer is $\alpha2$, and a thickness of the second ceramic layer is $T2$, the conditions of $\alpha1 \leq \alpha2$, $0.05\ \mu m < \alpha1 \leq 0.35\ um$, $T1 < T2$, and $0\ \mu m < T1 \leq 1.5\ \mu m$ are satisfied.

Preferably, each of the ceramic layers present between pairs of adjoining internal electrodes is a multilayer structure of a first ceramic layer and a second ceramic layer.

Alternatively, some of the ceramic layers present between pairs of adjoining internal electrodes may be formed of the single second ceramic layers alone.

Method of Production and Electronic Device According to Second Aspect of Invention To achieve the above objects, a method of production of a ceramic electronic device of a second aspect of the invention comprises the steps of forming a first ceramic coating layer on the surface of a substrate, forming an internal electrode on the surface of the first ceramic coating layer, forming a second ceramic coating layer on the surface of the first ceramic coating layer so as to cover the internal electrode, forming other internal electrode of a different layer on the surface of the second ceramic coating layer, forming a third ceramic coating layer on the surface of the second ceramic coating layer so as to cover the other internal electrode to thereby form a stack, and peeling off the stack from the substrate and successively stacking a plurality of peeled off stacks so that a first ceramic coating layer contained in one stack among two adjoining stacks contacts a third ceramic coating layer contained in the other stack, wherein, when a mean particle size of ceramic particles of the first ceramic coating layer is $\alpha1$, a thickness of the first ceramic coating layer is T1, a mean particle size of ceramic particles of the second ceramic coating layer is $\alpha 2$, a thickness of the second ceramic coating layer is T2, a mean particle size of ceramic particles of the third ceramic coating layer is $\alpha 3$, and a thickness of the third ceramic coating layer is T3, the conditions of $\alpha 1 \leq \alpha 2$, $\alpha 1 \leq \alpha 3$, $0.05 \, \mu m < \alpha 1 \leq 0.35 \, \mu m$, T1<T2, T1<T3, and $0 \, \mu m < T1 \leq 1.5 \, \mu m$ are satisfied.

By satisfying $\alpha 1 \leq \alpha 2$ and $\alpha 1 \leq \alpha 3$ it is possible to effectively avoid pinholes, withstand voltage defects, and other structural defects.

Further, by satisfying $0.05 \, \mu m < \alpha 1 \leq 0.35 \, \mu m$, it is possible to reduce sheet attack in the production process and reduce the short-circuit defect rate and withstand voltage defect rate.

Further, by satisfying T1<T2 and T1<T3, an increase in thickness due to the thickness T1 of the first ceramic layer can be avoided to a great extent and the acquired capacity and other electrical characteristics of for example a ceramic capacitor can be secured.

Further, by satisfying $0 \, \mu m < T1 \leq 1.5 \, \mu m$, it is possible to reduce the short-circuit defect rate and the withstand voltage defect rate due to sheet attack in the production process. If the thickness T1 of the first ceramic layer becomes $1.5 \, \mu m$ or more, the short-circuit defect rate will be lowered, but there is a tendency for the withstand voltage defect rate to become higher. The thickness T1 is the thickness of the ceramic coating layer before firing. When firing the ceramic body, the thickness of the ceramic coating layer is reduced. Therefore, even after firing, the above thickness condition is always satisfied.

In the method of production according to the present invention, a first ceramic coating layer is formed on the surface of a substrate, an internal electrode is printed on the surface of the first ceramic coating layer, then a second ceramic coating layer is formed on the surface of the substrate so as to cover the internal electrode. Next, an internal electrode is printed on the second ceramic coating layer, then a third ceramic coating layer is formed on the surface of the second ceramic coating layer so as to cover the internal electrode and thereby form a stack. Next, the stack is peeled off from the substrate. Therefore, it is possible to handle these layers as a difficult-to-damage stack and avoid delamination, pinholes, withstand voltage defects, and other structural defects due to damage.

Further, since the first ceramic coating layer is formed on the surface of the substrate and then an internal electrode is formed by printing etc. on the surface of the first ceramic coating layer, when peeling the stack off from the substrate, the peeled surface of the first ceramic coating layer becomes a smooth flat surface. Therefore, by using this smooth surface as the stacking surface, it is possible to avoid delamination, pinholes, withstand voltage defects, and other structural defects due to step differences.

Further, since the first ceramic coating layer is formed on the surface of the substrate, then the internal electrode is printed on the surface of the first ceramic coating layer, it is possible to coat a peeling agent on the substrate to facilitate the peeling of the first ceramic coating layer. Further, it is possible to reliably peel off even a very thin first ceramic coating layer of several micrometers from the substrate without causing damage. Therefore, it is possible to avoid to a great extent delamination, pinholes, withstand voltage defects, and other structural defects due to damage of the first ceramic coating layer at the time of peeling.

Further, since the internal electrode is formed on the first ceramic coating layer, unlike the case of printing an internal electrode on the surface of a peeling agent, the shape of the internal electrode will not end up being ruined due to the surface tension.

A plurality of peeled off stacks are successively stacked so that a first ceramic coating layer contained in one stack among two adjoining stacks contacts a third ceramic coating layer contained in the other stack. Therefore, a dense, high packing density first ceramic layer is interposed between internal electrodes between the stacked groups, so it is possible to reduce the short-circuit defect rate and the withstand voltage defect rate.

Preferably, the ceramic coating is coated using an extrusion type coating head. The amount of the ceramic coating fed is preferably controlled by a, mass flowmeter and a fixed displacement pump. The method of production according to the present invention is particularly suited to a multilayer ceramic capacitor.

Preferably, $\alpha 1 < \alpha 2$ and $\alpha 1 < \alpha 3$. By setting these ranges, the effects of the present invention are enhanced.

Preferably $T1+T3 \leq 6 \, \mu m$, more preferably $T1+T3 \leq 4 \, \mu m$. Further, preferably $T2 \leq 6 \, \mu m$, more preferably $T2 \leq 4 \, \mu m$. By setting such ranges, it is possible to reduce the thickness between layers of internal electrodes while maintaining the effects of the present invention and contribute to an improvement in the electrostatic capacity.

Further, preferably T1+T3 is substantially equal to T2. By setting this, it is possible to make the thicknesses between layers of internal electrodes uniform.

According to the method of production of a ceramic electronic device of the second aspect of the present invention, it is possible to efficiently produce a ceramic electronic device according to the second aspect of the present invention.

A ceramic electronic device according to the second aspect of the present invention has a ceramic body comprised of ceramic layers stacked together and a plurality of internal electrodes stacked inside the ceramic body via the ceramic layers, wherein at least one of the ceramic layers present between pairs of adjoining internal electrodes is a multilayer structure of a first ceramic layer and a third ceramic layer, each of the remaining ceramic layers in the ceramic layers present between pairs of adjoining internal electrodes is configured by a second ceramic layer alone, and, when a mean particle size of ceramic particles of the first ceramic layer is $\alpha 1$, a thickness of the first ceramic layer is T1, a mean particle size of ceramic particles of the second ceramic layer is $\alpha 2$, a thickness of the second ceramic layer is T2, a mean particle size of ceramic particles of the third ceramic layer is $\alpha 3$, and a thickness of the third ceramic layer is T3, the conditions of $\alpha 1 \leq \alpha 2$, $\alpha 1 \leq \alpha 3$, $0.05 \, \mu m < \alpha 1 \leq 0.35 \, \mu m$, T1<T2, T1<T3, and $0 \, \mu m < T1 < 1.5 \, \mu m$ are satisfied.

Preferably, there is at least one ceramic layer configured by a second ceramic layer alone between pairs of adjoining ceramic layers of multilayer structures comprised of the first ceramic layer and third ceramic layer. In this case, it is possible to increase the total thickness in each stacked unit (stacked group) and reduce the times of stacking the stacked units,

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

First Embodiment

First, a ceramic electronic device of the present invention will be explained. As a ceramic electronic device of the present invention, a piezoelectric device, PTC thermistor, NTC thermistor, varistor, etc. may be mentioned. The ceramic electronic device of the present invention is not however limited to these. The invention may be applied to all ceramic electronic devices where a plurality of internal electrodes are stacked inside a ceramic body through ceramic layers. In the following explanation, the case of application of the present invention to a multilayer ceramic capacitor will be explained.

Figure 1:
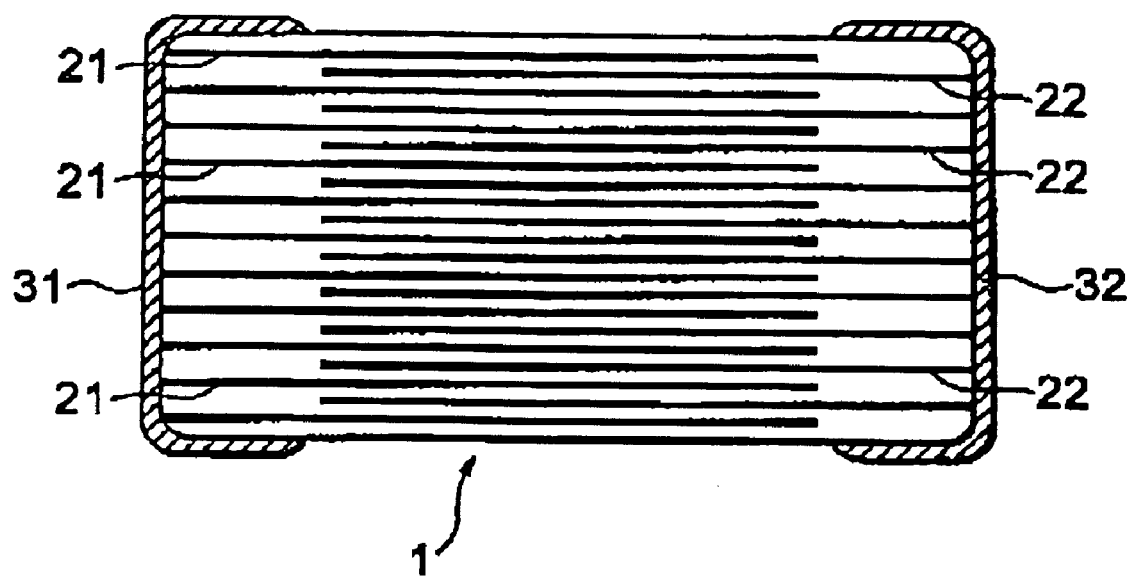
FIG. 1 is a cross-sectional view of a multilayer ceramic capacitor as a ceramic electronic device according to an embodiment of the present invention.

As shown in FIG. 1, a multilayer ceramic capacitor includes a ceramic body 1 made of a plurality of ceramic dielectric layers (also called "ceramic layers") and internal electrodes 21 and 22 inside the ceramic body 1. Internal electrodes 21 and 22 are embedded inside the ceramic body 1 at intervals from each other. FIG. 1 shows a multilayer ceramic capacitor, so the adjoining internal electrodes 21 and 22 are connected at alternating ends to terminal electrodes 31 and 32 provided at the two facing ends of the ceramic body 1 to form a multilayer capacitor circuit.

Figure 2:
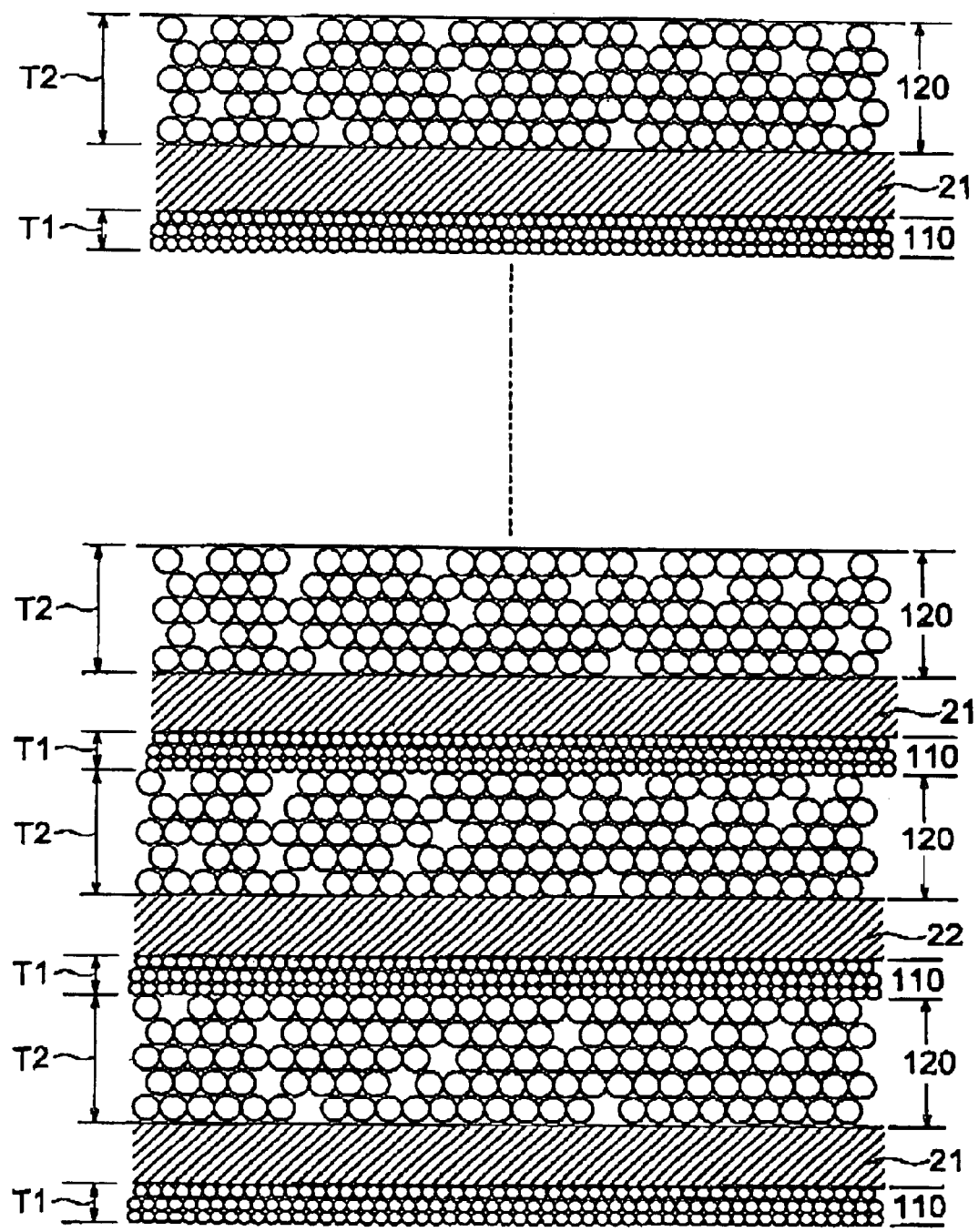
FIG. 2 is an enlarged cross-sectional view schematically showing the internal structure of the multilayer ceramic capacitor shown in FIG. 1.

FIG. 2 is an enlarged cross-sectional view schematically showing the internal structure of the multilayer ceramic capacitor shown in FIG. 1. For convenience in illustration, the middle part is omitted. Each of the internal electrodes 21 and 22 contacts a first ceramic layer 110 at one surface and a second ceramic layer 120 at the other surface. In this embodiment, the first ceramic layer 110 and the second ceramic layer 120 are formed by ceramic dielectrics.

As shown in FIG. 2, the ceramic mean particle size $\alpha 1$ of the first ceramic layer 110, its thickness T1, the ceramic mean particle size $\alpha 2$ of the second ceramic layer, and its thickness T2 satisfy the relations $\alpha 1 \leq \alpha 2$, $0.05\ \mu m < \alpha 1 \leq 0.35\ \mu m$, T1<T2, and $0\ \mu m < T1 < 1.5$ Mm.

Further, a plurality of groups of the first ceramic layer 110, an internal electrode 21 or 22, and the second ceramic layer 120 are successively stacked with the first ceramic layers 110 and the second ceramic layers 120 in contact. The number of these stacked is selected in accordance with the outer dimensions which have to be satisfied and the required capacitance etc. For example, to obtain a capacitance of 100 $\mu F$, as many as several hundreds of these are stacked. The ceramic layers are stacked in a number according to the number of the internal electrodes and can give a multilayer ceramic capacitor able to give a corresponding capacitance.

Further, since the ceramic mean particle size $\alpha 1$ of the first ceramic layers 110 and the ceramic mean particle size $\alpha 2$ of the second ceramic layers 120 satisfy $\alpha 1 \leq \alpha 2$, it is possible to form dense, high packing density first ceramic layers 110. Therefore, it is possible to avoid to a great extent pinholes, withstand voltage defects, and other structural defects.

Further, since the ceramic mean particle size $\alpha 1$ of the first ceramic layers 110 satisfies $0.05\ \mu m < \alpha 1 \leq 0.35\ \mu m$ it is possible to reduce the short-circuit defect rate and the withstand voltage defect rate.

Further, since the thickness T1 of the first ceramic layers 110 and the thickness T2 of the second ceramic layers 120 satisfy T1<T2, it is possible to avoid to a great extent an increase in thickness due to the thickness T1 of the first ceramic layers 110, avoid to a great extent an increase in thickness of the capacity layers in for example a multilayer ceramic capacitor, and secure the acquired capacitance and other electrical characteristics. Specifically, it is possible to realize a 100 $\mu F$ multilayer ceramic capacitor of a horizontal×vertical size of 3.2×1.6 (mm).

Since the thickness T1 of the first ceramic layers 110 satisfies $0\ \mu m < T1 < 1.5\ \mu m$, no short-circuit defects and withstand voltage defects are incurred. If the thickness T1 of the first ceramic layers 110 becomes more than 1.5 $\mu m$, while the short-circuit defect rate will be lowered, there is a tendency for the withstand voltage defect rate to become higher. Note that the thickness T1 is the thickness of the ceramic coating layers before firing. When firing the device, the pre-firing ceramic coating layers which will form the ceramic layers shrink, so the above thickness condition will always be satisfied.

Next, the method of production of a ceramic electronic device according to an embodiment of the present invention will be explained with reference to FIG. 3 to FIG. 14.

Figure 3:
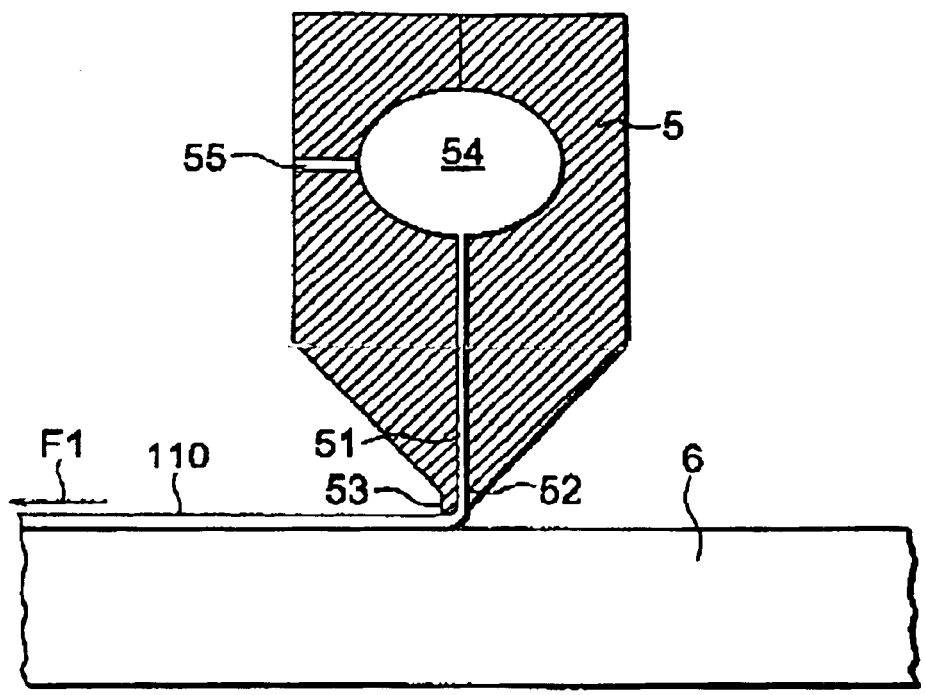
FIG. 3 is a schematic cross-sectional view of a method of production of a multilayer ceramic capacitor according to an embodiment of the present invention.
Figure 4:
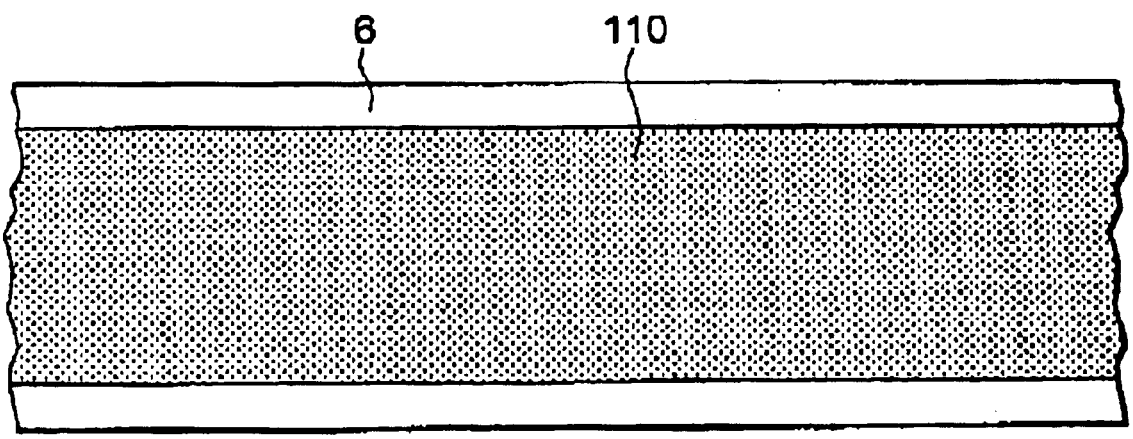
FIG. 4 is a schematic plane view of a first ceramic coating layer obtained by the step shown FIG. 3.
Figure 5:
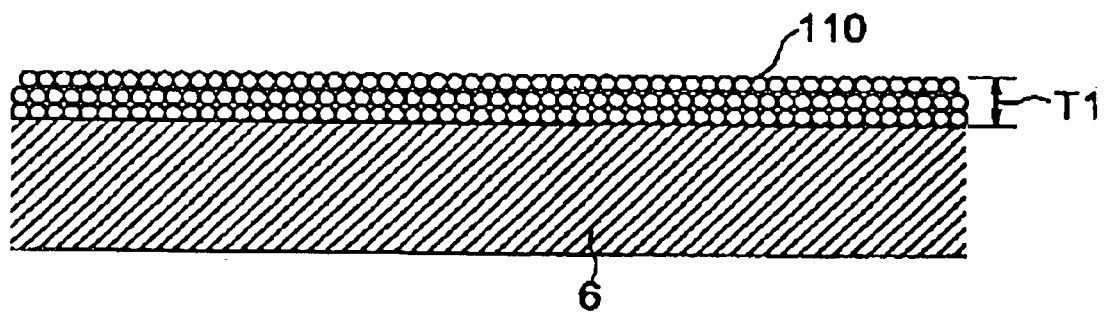
FIG. 5 is a cross-sectional view schematically showing, the structure of the first ceramic coating layer shown in FIG. 4.

First, as shown in FIG. 3 to FIG. 5, a coating apparatus 5 is used to coat a ceramic coating on the surface of a substrate 6 to thereby form a first ceramic coating layer 110 having a thickness T1 (see FIG. 5).

The first ceramic coating layer 110 is formed so that its thickness T1 satisfies $0<T1\leq 1.5$ μm. If the thickness T1 of the first ceramic coating layer 110 becomes more than 1.5 Mm, the short-circuit defect rate will be reduced, but there will be a tendency for the withstand voltage defect rate to become higher.

For the substrate 6, a flexible organic resin film, specifically a polyethylene terephthalate film (PET film) is used.

The substrate 6 is preferably treated in advance on the surface where the ceramic coating layer will be formed to facilitate peeling of the first ceramic coating layer 110. The treatment may be performed by lightly coating one surface of the substrate 6 with a peeling film of Si etc. By applying this peeling treatment, it is possible to easily peel the first ceramic coating layer 110 formed on the substrate 6 from the substrate 6.

For the ceramic coating, it is possible to use one comprised of an acrylic resin or butyral resin or other organic binder, organic solvent, plasticizer, and ceramic powder mixed together to form a coating.

The mean particle size α1 of the ceramic particles included in the ceramic coating for forming the first ceramic coating layer 110 is in a range of $0.05$ μm$<\alpha 1\leq 0.35$ μm. If the mean particle size α1 becomes smaller than 0.05 μm, there will be a tendency for the dispersibility of the ceramic particles at the time of preparing the ceramic coating to deteriorate and for formation of a uniform ceramic coating layer to become impossible.

The mean particle size α1 of the ceramic particles forming the first ceramic layer 110 further satisfies $\alpha 1\leq 0.35$ μm. If in this range, short-circuit defects and withstand voltage defects can be reduced. If the mean particle size α1 of the ceramic particles exceeds 0.35 μm, there will be a tendency for short-circuit defects and withstand voltage defects to occur easily. This means that there is a critical point at which the effects of sheet attack can be reduced near the mean particle size α1 of the ceramic particles of 0.35 μm. The mean particle sizes α1 and α2 can be considered substantially the same before and after firing.

In coating and forming the first ceramic coating layer 110, it is possible to use as the coating apparatus 5 an extrusion type coating head, the doctor blade method, the reverse roll method, etc. Among these, an extrusion type coating head is particularly preferable.

The illustrated embodiment shows an example of the pasting apparatus 5 using an extrusion type coating head. If using a coating apparatus 5 provided with an extrusion type coating head, it is possible to obtain a uniform first ceramic coating layer 110 having an extremely good surface precision and little unevenness of thickness.

The extrusion type coating head 5 shown in FIG. 3 is provided with a ceramic coating discharge slit 51, an upstream side nozzle 52, a downstream side nozzle 53, a ceramic coating reservoir 54, a feed port 55 to the ceramic coating reservoir 54, etc. Such an extrusion type coating head is known. In FIG. 3, reference F1 shows the traveling direction of the substrate 6.

When obtaining a piezoelectric device, PTC thermistor, NTC thermistor, varistor, or other ceramic electronic device, as the ceramic powder, one of a piezoelectric ceramic material, positive temperature coefficient ceramic material, negative temperature coefficient ceramic material, or piezoelectric nonlinear ceramic material is used.

Figure 6:
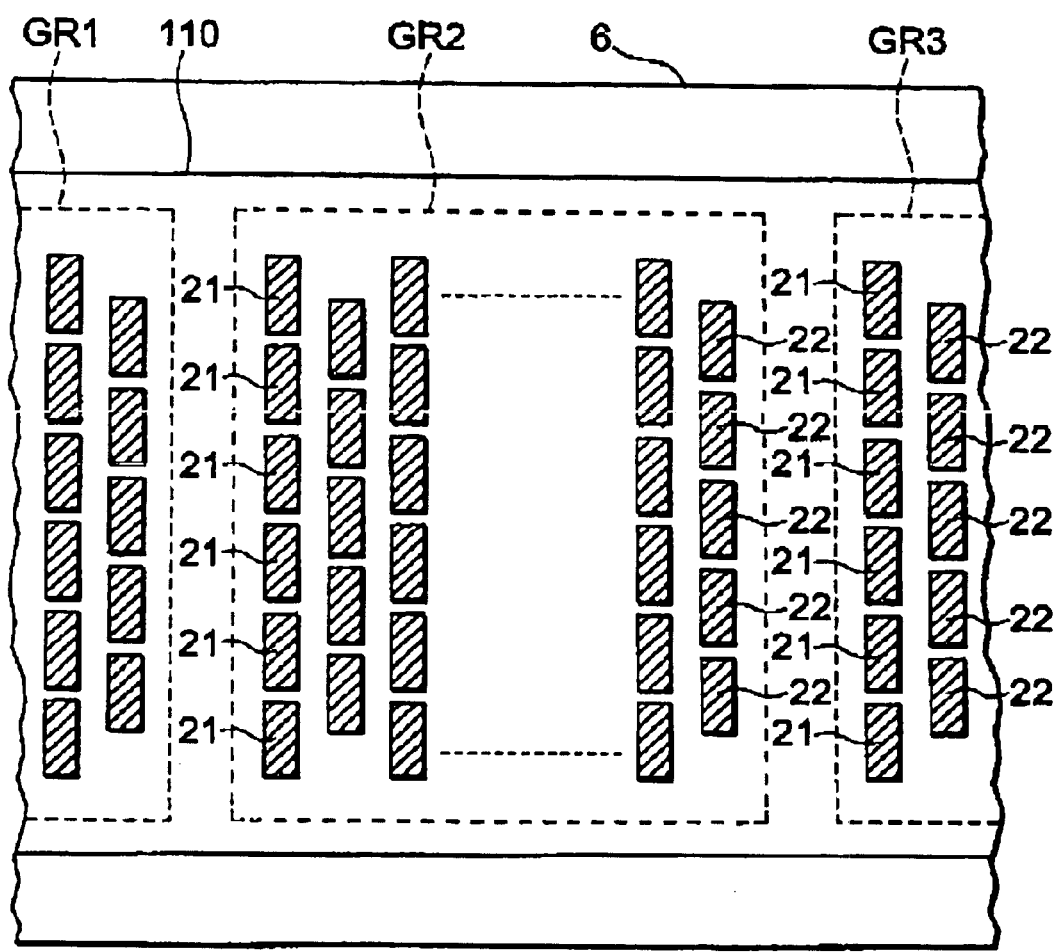
FIG. 6 is a plan view of a step after the step shown in FIG. 3.
Figure 7:
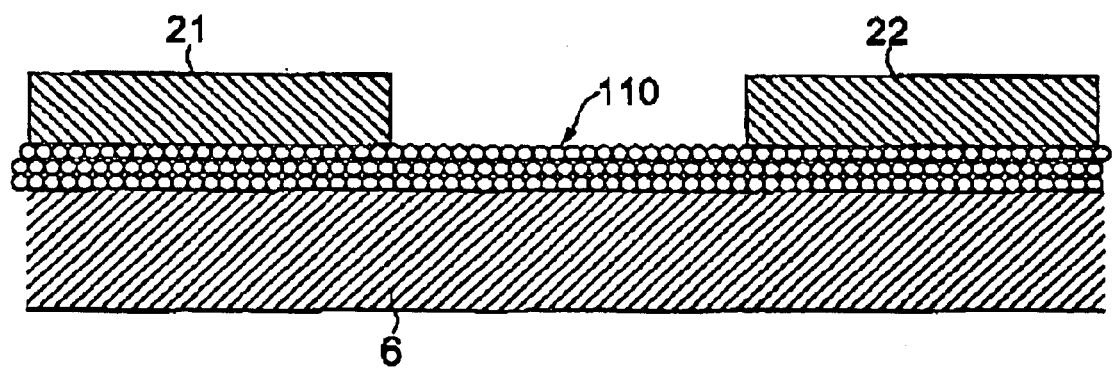
FIG. 7 is a cross-sectional view schematically showing the structure of the first ceramic coating layer and internal electrodes obtained by the step shown in FIG. 6.
Figure 8:
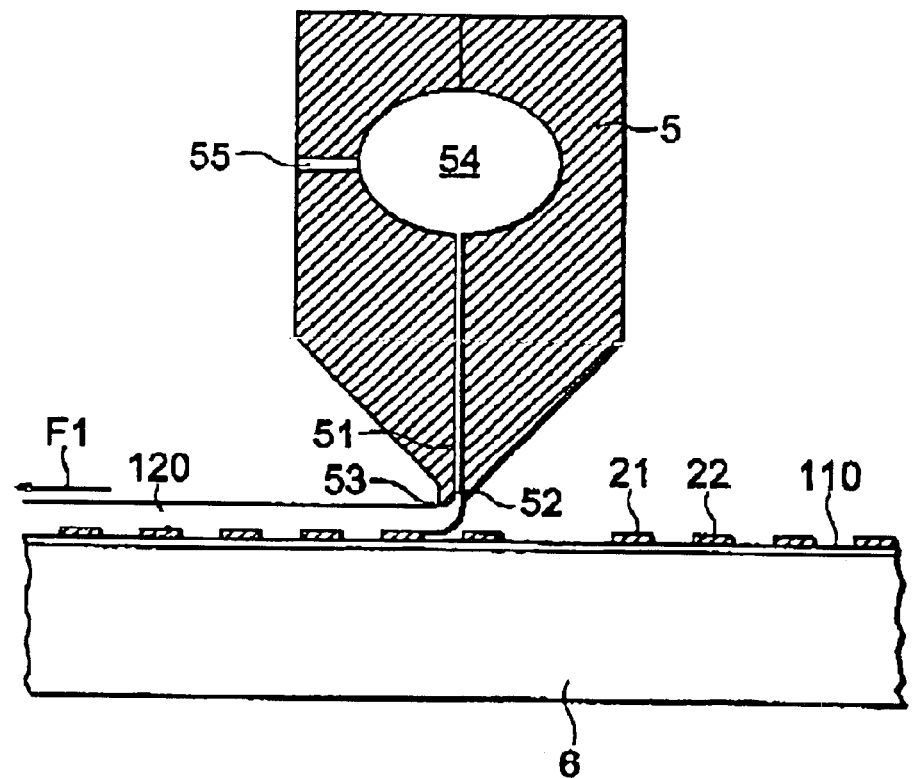
FIG. 8 is a schematic cross-sectional view of a step after the step shown in FIG. 6.
Figure 9:
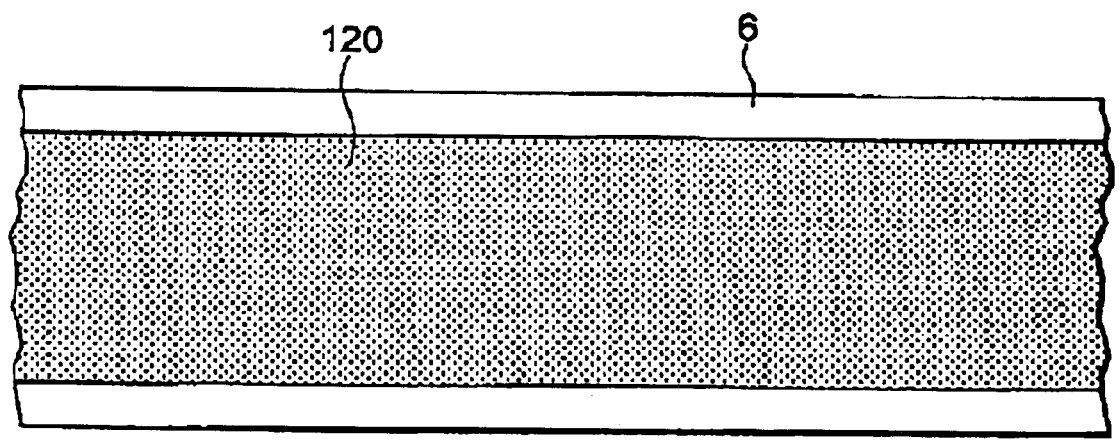
FIG. 9 is a schematic plane view of a second ceramic coating layer obtained by the step shown in FIG. 8.
Figure 10:
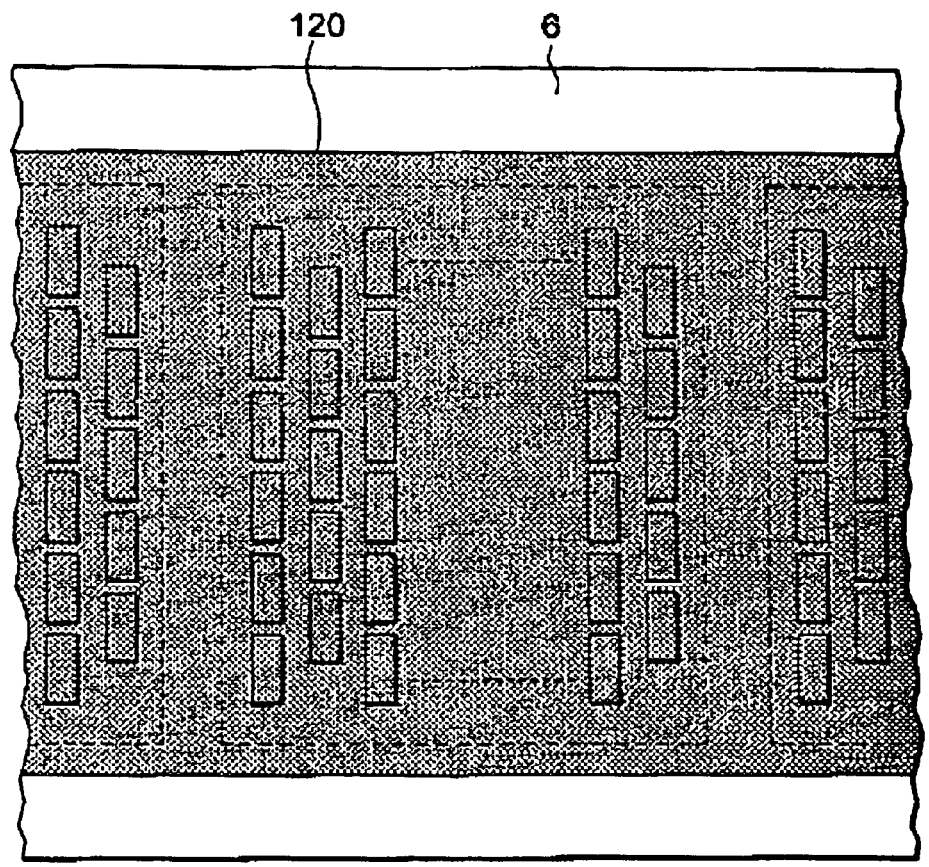
FIG. 10 is a plan view of a step after the step shown in FIG. 8.

Next, after a drying step for drying the first ceramic coating layer 110 and other necessary steps, as shown in FIG. 6 and FIG. 7, internal electrodes 21 and 22 are printed on the surface of the first ceramic coating layer 110. As the internal electrode paste for the internal electrodes 21 and 22, a conventionally known one may be used. Specifically, an organic binder dissolved in an organic solvent is used as a vehicle, Ag, Pd, Ni, Cu, or another conductive metal powder is dispersed in the vehicle, and in some cases a diluent for adjusting the viscosity is added to prepare the paste. As the organic solvent in the vehicle, terpineol, methyl ethyl ketone, etc. is used. As the binder, ethyl cellulose, nitrocellulose, or another cellulose-based resin or butyl methacrylate, methyl methacrylate, or another acrylic-based resin is used. Further, as the diluent, an aromatic hydrocarbon, a fatty acid hydrocarbon, etc. is used.

In the case of the present invention, even if the internal electrode paste of the above composition is coated on the first ceramic coating layer 110 to form the internal electrodes 21 and 22, the first ceramic coating layer 110 is resistant to sheet attack by the organic solvent contained in the internal electrode paste. This is believed to be because the sheet attack is blocked since the mean particle size α1 of the ceramic particles contained in the ceramic coating for forming the first ceramic coating layer 110 was made one of a range of $0.05$ μm$<\alpha 1\leq 0.35$ μm.

Therefore, according to the present invention, it does not become difficult to peel the first ceramic coating layer 110 from the substrate and no holes or wrinkles occur in the first ceramic coating layer 110. Therefore, it is possible to avoid short-circuit defects and withstand voltage defects and secure a predetermined electrostatic capacitance, The internal electrodes 21 and 22 are formed as a group of patterns. The internal electrodes 21 and 22 can be formed in patterns of thousands of electrodes regularly arranged in for example 30 cm×30 cm regions GR1 to GR3 (see FIG. 6). As the printing means, the ordinary screen printing can be applied. Further, gravure printing etc. may also be applied.

As explained above, since the internal electrodes 21 and 22 are formed on the first ceramic coating layer 110, unlike the case of printing internal electrodes 21 and 22 on the surface of a peeling agent, the shapes of the internal electrodes 21 and 22 will not end up being ruined due to the surface tension.

Next, after the step of drying the internal electrodes etc., as shown in FIG. 8 to FIG. 11, a second ceramic coating layer 120 is formed on the surface of the first ceramic coating layer 110 so as to cover the internal electrodes 21 and 22. The second ceramic coating layer 120 can also be formed using a coating apparatus 5 using an extrusion type coating head.

The ceramic coating for forming the second ceramic coating layer 120 may be the same in composition as the ceramic coating for forming the first ceramic coating layer 110, but the mean particle size α2 of the ceramic particles included in the ceramic coating is selected to satisfy $\alpha 1\leq \alpha 2$ with respect to the mean particle size α1 of the ceramic particles included in the ceramic coating for forming the first ceramic coating layer 110.

By satisfying $\alpha 1\leq \alpha 2$, it is possible to form a dense, high packing density first ceramic coating layer 110 and possible to reduce the required thickness by the second ceramic coating layer 120. Therefore, it is possible to avoid to a great extent pinholes, withstand voltage defects, and other structural defects.

As explained above, the mean particle size α1 of the first ceramic coating layer 110 is selected to be not more than 0.05 μm. If viewed from the standpoint of blocking sheet attack and improving the withstand voltage, a smaller mean particle size α1 is better, but if the mean particle size α1 becomes smaller than 0.05 μm, there is a tendency for the dispersibility at the time of preparing the ceramic coating to deteriorate and for formation of a uniform ceramic coating layer to become impossible.

The second ceramic coating layer 120 is formed so that its thickness T1 satisfies T1<T2 with respect to the thickness T1 of the first ceramic coating layer 110. By satisfying this relationship, it is possible to restrict the thickness T1 of the first ceramic coating layer 110, avoid to a great extent an increase in thickness due to the thickness T1 of the first ceramic coating layer 110, avoid to a great extent an increase in thickness of the capacity layer in for example a multilayer ceramic capacitor, and secure the acquired capacity and other electrical characteristics.

When producing a small sized and large capacitance multilayer ceramic capacitor, the total (T1+T2) of the thicknesses T1 and T2 should be as small as possible in the range able to secure the required withstand voltage. As one example, when obtaining a 100 μF multilayer ceramic capacitor having a planar shape of 3.2×1.6 mm, the total (T1+T2) of the thicknesses T1 and T2 is preferably not more than 6 μm, more preferably not more than 4 μm. By making the thickness between layers of internal electrodes smaller, it is possible to increase the electrostatic capacitance and contribute to a reduction of the overall size.

Figure 11:
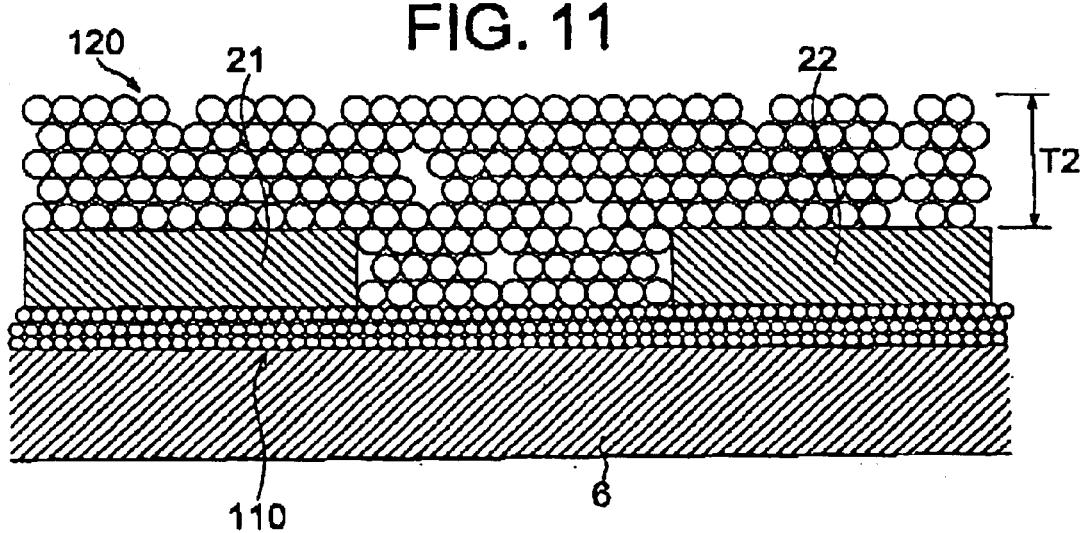
FIG. 11 is a schematic view of a second ceramic coating layer obtained by the step shown in FIG. 10.

Assuming that the thickness T2 of the second ceramic coating layer 120 satisfies T1<T2 and the thickness T1 becomes smaller than 1.5 μm, the total (T1+T2) of the thicknesses is selected to be kept to not more than 6 μm or within 4 μm. Note that as shown in FIG. 11, by coating the second ceramic coating layer 120, the second ceramic coating layer 120 is also packed between the internal electrodes 21 and 22, 80 the smoothness of the surface of the second ceramic coating layer 120 is secured. This contributes to the elimination of the step differences at the time of stacking. The surface of the second ceramic coating layer 120 is the portion contacting the surface of the first ceramic coating layer 110. Securing the smoothness of the surface of that portion contributes to the elimination of step differences in the stack and enables a greater number of layers to be stacked. The same is true in the later explained second embodiment as well. However, in the later explained second embodiment, the portion contacting the surface of the first ceramic coating layer 110 is the surface of the third ceramic coating layer 130 (see FIG. 15 or FIG. 16).

Figure 12:
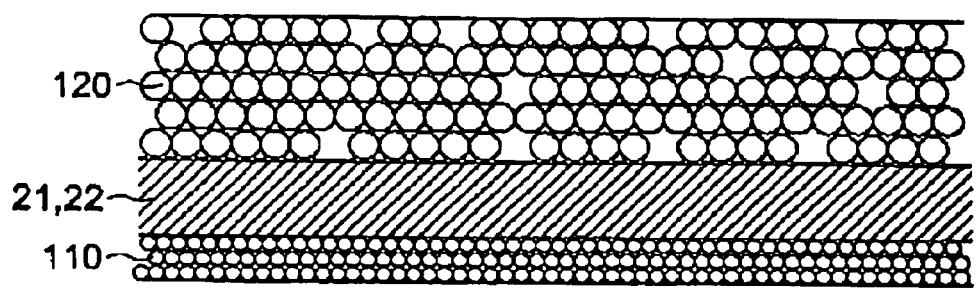
FIG. 12 is a schematic view of a step after the step shown in FIG. 11.

Next, after the drying step and other necessary steps, the combined stack of the first ceramic coating layer 110, internal electrodes 21 and/or 22, and second ceramic coating layer 120 is peeled off as a unit from the substrate 6. Due to this, as shown in FIG. 12, it is possible to obtain a unit of a combined stack of the first ceramic coating layer 110, internal electrodes 21 and/or 22, and second ceramic coating layer 120.

In the present embodiment, since it is possible to peel off the combined stack of the first ceramic coating layer 110, internal electrodes 21 and/or 22, and second ceramic coating layer 120 as a unit, it is possible to handle these layers as a difficult-to-damage stack and avoid to a great extent delamination, pinholes, withstand voltage defects, and other structural defects due to damage.

Further, in the present embodiment, since the first ceramic coating layer 110 is formed on the surface of the substrate and then internal electrodes 21 and 22 are printed on the surface of the first ceramic coating layer 110, when peeling the first ceramic coating layer 110 off from the substrate, the peeled surface of the first ceramic coating layer 110 becomes a smooth flat surface.

Figure 13:
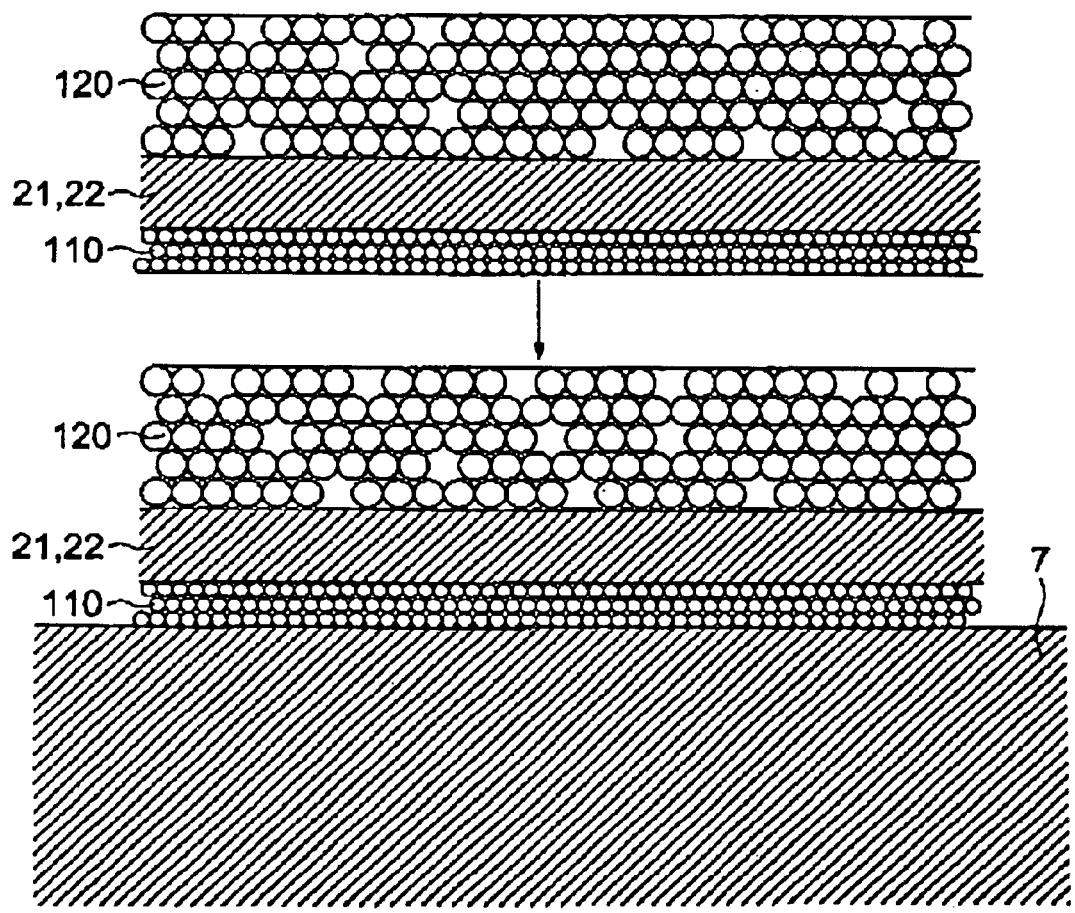
FIG. 13 is a schematic view of a step after the step shown in FIG. 12.

Next, the regions GR1 to GR3 of FIG. 6 are punched out. Exactly the necessary number of the punched out stacks are successively stacked on a table 7 as units of the first ceramic coating layer 110, internal electrodes 21 and/or 22, and second ceramic coating layer 120 as shown in FIG. 13. In stacking these units, they are successively stacked so that the first ceramic coating layer 110 and second ceramic coating layer 120 contact each other between adjoining stacks.

Figure 14:
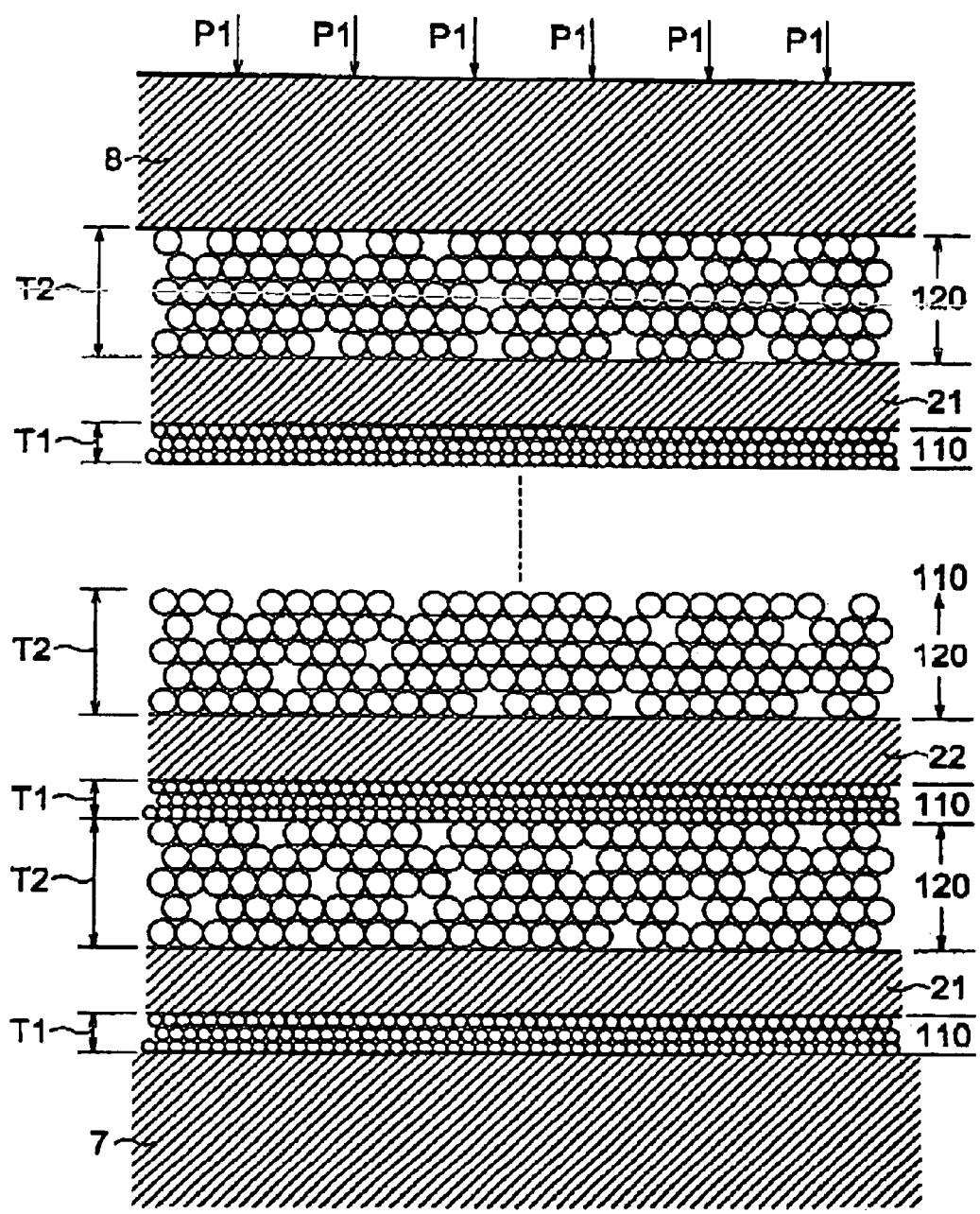
FIG. 14 is a schematic view of a step after the step shown in FIG. 13.

The thus obtained stack, as shown in FIG. 14, is then heat and pressure bonded by a press 8.

Here, since the ceramic mean particle size α1 of the first ceramic layer 110 and the ceramic mean particle size α2 of the second ceramic layer 120 satisfy α1≦α2, it is possible to form a dense, high packing density first ceramic layer 110. Therefore, it is possible to avoid to a great extent pinholes, withstand voltage defects, and other structural defects.

Further, the peeled surface of the first ceramic coating layer 110 is a smooth and flat surface. Therefore, by using this smooth peeled surface as the stacking surface, it is possible to avoid delamination, pinholes, withstand voltage defects, and other structural defects due to step differences.

Next, the stack is cut to obtain multilayer green chips. The obtained multilayer green chips are treated under predetermined temperature conditions to remove the binder, then fired and further provided with terminal electrodes by baking to form the desired ceramic electronic devices, The conditions for removal of the binder and firing are known in the art. For example, the chips are kept at 280° C. for 12 hours to remove the binder and are fired in a reducing atmosphere at 1300° C. for 2 hours. Terminal electrodes 31 and 32 are formed on the stacks obtained after firing. The material and method of formation of the terminal electrodes 31 and 32 are well known in the art. For example, copper is used as the main ingredient and baked on in $N_2+H_2$ at 800° C. for 30 minutes to form a plating. Next, the effects of the ceramic electronic device according to the present invention will be explained with reference to experimental data.

Using the method of production according to the present invention, multilayer ceramic capacitors of vertical× horizontal dimensions of 3.2×2.5 (mm) and 100 layers were produced. In the production process, the total (T1+T2) of the thicknesses of the first and second ceramic coating layers 110 and 120 was made a target value of 4 μm. In that range, the thickness T1 of the first ceramic coating layer 110 and the thickness T2 of the second ceramic coating layer 120 were changed. Further, the mean particle sizes α1 and α2 of the ceramic coatings were changed in the range of the present invention to thereby prepare samples of different multilayer ceramic capacitors. These are designated as Examples 1 to 4.

On the other hand, the thickness T1 of the first ceramic coating layer 110 and the thickness T2 of the second ceramic coating layer 120 and further the mean particle sizes α1 and α2 of the ceramic coatings were changed to be outside the ranges of the present invention so as to prepare samples of different multilayer ceramic capacitors. The obtained samples of multilayer ceramic capacitors are designated as Comparative Examples 1 to 3. Further, a sample of a multilayer ceramic capacitor having only the first ceramic coating layers and not having the second ceramic coating layers was prepared, This sample was obtained by successively stacking units obtained by coating a ceramic coating layer on the substrate and forming internal electrodes on top and is an example of application of the general method of production of the related art. This sample is designated as Comparative Example 4.

The above Examples 1 to 4 and Comparative Examples 1 to 4 were measured as to their short-circuit defect rates and withstand voltage defect rates. The withstand voltage defect rate was found by applying a 50V DC voltage, judging the insulation resistance under $1\times10^4$ Ω as being defective, and finding the percentage of the number of defects. Further, the short-circuit defect rate was found by applying a 2 V DC voltage, judging the insulation resistance under 1×10 a as being defective, and finding the percentage of the number of defects. The number of samples N provided for the tests was made 100 for each of the examples and comparative examples.

The results of measurement of the short-circuit defect rate and withstand voltage defect rate for Examples 1 to 4 and Comparative Examples 1 to 4 are shown together with the thicknesses T1 and T2 and mean particle sizes α1 and α2 of the ceramic coating layers in Table 1.

TABLE 1

|  | First ceramic layer | | Second ceramic layer | | Short-circuit defect rate (%) | Withstand voltage defect rate (%) |
| --- | --- | --- | --- | --- | --- | --- |
|  | α1 (μm) | T1 (μm) | α2 (μm) | T2 (μm) | | |
| Ex. 1 | 0.35 | 1.0 | 0.35 | 3.0 | 6 | 5 |
| Ex. 2 | 0.20 | 1.0 | 0.35 | 3.0 | 3 | 4 |
| Ex. 3 | 0.20 | 0.6 | 0.35 | 3.4 | 2 | 3 |
| EX. 4 | 0.20 | 1.0 | 0.20 | 3.0 | 1 | 1 |
| Comp. Ex. 1 | 0.35 | *1.5 | 0.35 | 2.5 | 11 | 9 |
| Comp. Ex. 2 | 0.35 | *2.0 | 0.35 | *2.0 | 15 | 10 |
| Comp. Ex. 3 | *0.50 | 1.0 | 0.50 | 3.0 | 41 | 2.7 |
| Comp. Ex. 4 | 0.35 | *4.0 | — | — | 35 | 21 |

As shown in Table 1, in Comparative Example 4 of the related art obtained by successively stacking units obtained by coating a ceramic coating layer on a substrate and forming internal electrodes on top, the short-circuit defect rate reached as high as 35% and the withstand voltage defect rate also was a high 21%.

In Comparative Examples 1 to 3 having the first ceramic coating layers and second ceramic coating layers, but having thicknesses T1 and T2 and mean particle sizes α1 and α2 of the ceramic particles not satisfying one of α1 ≦α2, 0.05 μm<α1≦0.35 μm and T1<T2, 0 μm<T1<1.5 μm the short-circuit defect rates were in the range of 11% to 41% and the withstand voltage defect rates were high values of 9% to 17% as well.

As opposed to this, Examples 1 to 4 according to the present invention, satisfying the above relations, were kept in ranges of short-circuit defect rates of 1% to 6% and ranges of withstand voltage defect rates of 1% to 5%. This shows remarkable superiority over Comparative Examples 1 to 4.

As explained above, according to the present invention, the following effects can be obtained:

(a) It is possible to provide a ceramic electronic device, in particular a multilayer ceramic capacitor, resistant to short-circuit defects, withstand voltage defects, and other structural defects.

(b) It is possible to provide a method of production of a high precision, high reliability ceramic electronic device able to remarkably reduce the difficulty in peeling and probability of occurrence of defects in characteristics of the product even if reducing the thickness of the ceramic coating layers.

(c) It is possible to provide a method of production of a ceramic electronic device remarkably reducing the step differences between layers due to the electrodes and improving the reliability.

Second Embodiment

Next, a multilayer ceramic capacitor according to another embodiment of the present invention will be explained.

Figure 15:
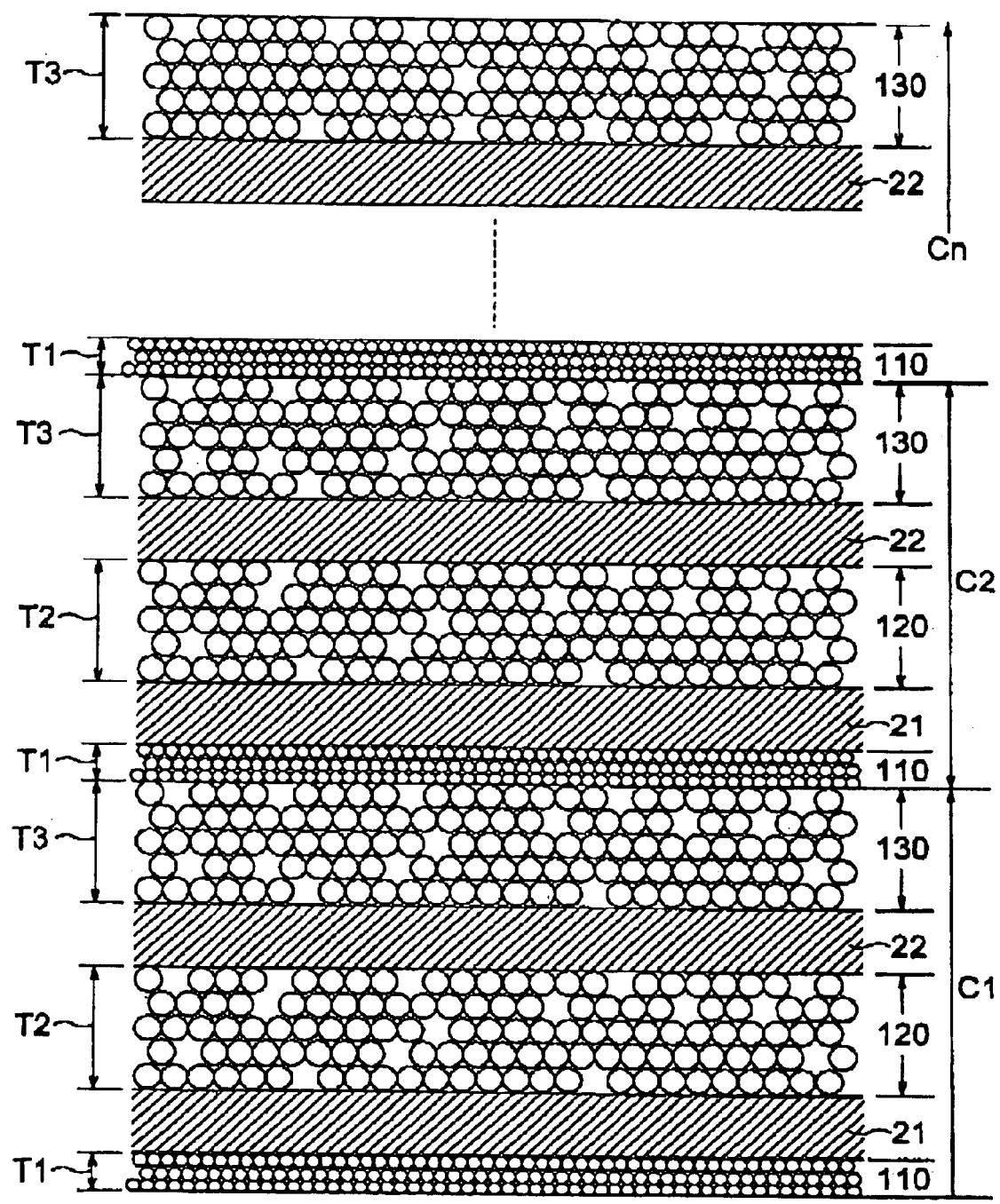
FIG. 15 is an enlarged cross-sectional view schematically showing the internal structure of a multilayer ceramic capacitor according to another embodiment of the present invention.

FIG. 15 is an enlarged cross-sectional view schematically showing the internal structure of a multilayer ceramic capacitor according to a second embodiment of the present invention. For convenience in illustration, the middle part is not shown. The overall cross-section of the multilayer ceramic capacitor according to the present embodiment is the same as that shown in FIG. 1 and includes the ceramic body 1, internal electrodes 21 and 22, and terminal electrodes 31 and 32. In the present embodiment, however, as shown in FIG. 15, the ceramic body 1 includes first ceramic layers 110, second ceramic layers 120, and third ceramic layers 130. Note that at least one ceramic layer present between pairs of adjoining internal electrodes 21 and 22 is a multilayer structure. From this viewpoint, the third ceramic layer 130 in the present embodiment corresponds to the second ceramic layer 120 in the first embodiment.

A first ceramic layer 110 contacts one surface of an internal electrode 21. A second ceramic layer 120 contacts another internal electrodes 22 not adjoining a first ceramic layer 110.

A third ceramic layer 130 adjoins the other surface of the internal electrode 22 which the second ceramic layer 120 contacts.

The first to third ceramic layers 110 to 130 and the internal electrodes 21 and 22 form stacked groups (stacked units) C1, C2, . . . Cn each having the first ceramic layer 110 as a bottommost layer and the third ceramic layer 130 as a topmost layer.

There are a plurality (n) of stacked groups. The "n" of the stacked groups C1 to Cn may be any number. Each of the stacked groups C1 to Cn is comprised of a first ceramic layer 110 and a third ceramic layer 130 stacked adjoining each other via internal electrodes 21 or 22, The first ceramic layer 110 and the second and third ceramic layers 120 and 130 are of the same material, but differ in the ceramic mean particle size and thickness. That is, the ceramic mean particle size α1 of the first ceramic layer 110, its thickness T1, the ceramic mean particle size α2 of the second ceramic layer 120, its thickness T2, the ceramic mean particle size α3 of the third ceramic layer 130, and its thickness T3 satisfy the relations:

α1≦α2 or α3, 0.05<α1≦0.35 μm,

T<T2 or T3, and

0<T1<0.5 μm.

The ceramic body 1 includes first ceramic layers 110, second ceramic layers 120, and third ceramic layers 130. The first ceramic layer 110 contacts one surface of the internal electrode 21. The second ceramic layer 120 contacts; the other surface of the internal electrode 21 contacted by the first ceramic layer 110 and further contacts one surface of another internal electrode 22 not contacted by the first ceramic layer 110. The third ceramic layer 130 contacts the other surface of the internal electrode 22 contacted by the second ceramic layer 120.

The first to third ceramic layers 110 to 130 and the internal electrodes 21 and 22 form stacked groups C1, C2, . . . Cn each having the first ceramic layer 110 as a bottommost layer and the third ceramic layer 130 as a topmost layer.

Further, each of the stacked groups C1 to Cn is stacked with the first ceramic layer 110 and third ceramic layer 130 in contact. Due to this structure, dense, high packing density first ceramic layers 110 are interposed between the stacked groups C1 to Cn, and it is possible to reduce the short-circuit defect rate and withstand voltage defect rate.

The ceramic mean particle sizes $\alpha 1$ to $\alpha 3$ of the first to third ceramic layers 110 to 130 satisfy $\alpha 1 \leq \alpha 2$ and $\alpha 1 \leq \alpha 3$. Due to this configuration, is possible to effectively avoid pinholes, withstand voltage defects, and other structural defects.

Further, the ceramic mean particle size $\alpha 1$ of the first ceramic layer 110 satisfies $0.05 < \alpha 1 \leq 0.35$ $\mu$m. By satisfying this condition, it is possible to reduce sheet attack in the production process and reduce the short-circuit defect rate and withstand voltage defect rate.

Further, the thicknesses T1 to T3 of the first to third ceramic layers 110 to 130 satisfy T1<T2 and T1<T3. According to this, it is possible to avoid to a great extent an increase in thickness of the ceramic layers due to the thickness T1 of the first ceramic layers 110 and to secure the acquired capacity and other electrical characteristics in the multilayer ceramic capacitor.

The thickness T1 of the first ceramic layers 110 satisfies 0<T1<1.5 $\mu$m. If in this range, it is possible to reduce the short-circuit defect rate and the withstand voltage defect rate due to sheet attack in the production process. No short-circuit defects and withstand voltage defects are incurred either. If the thickness T1 of the first ceramic layers 110 becomes 1.5 $\mu$m or more, the short-circuit defect rate will be lowered, but there is a tendency for the withstand voltage defect rate to become higher. The thickness T1 is the thickness of the ceramic coating layers before firing. When firing the ceramic body, the thickness of the ceramic coating layers is reduced. Therefore, even after firing, the above thickness condition is always satisfied.

Figure 16:
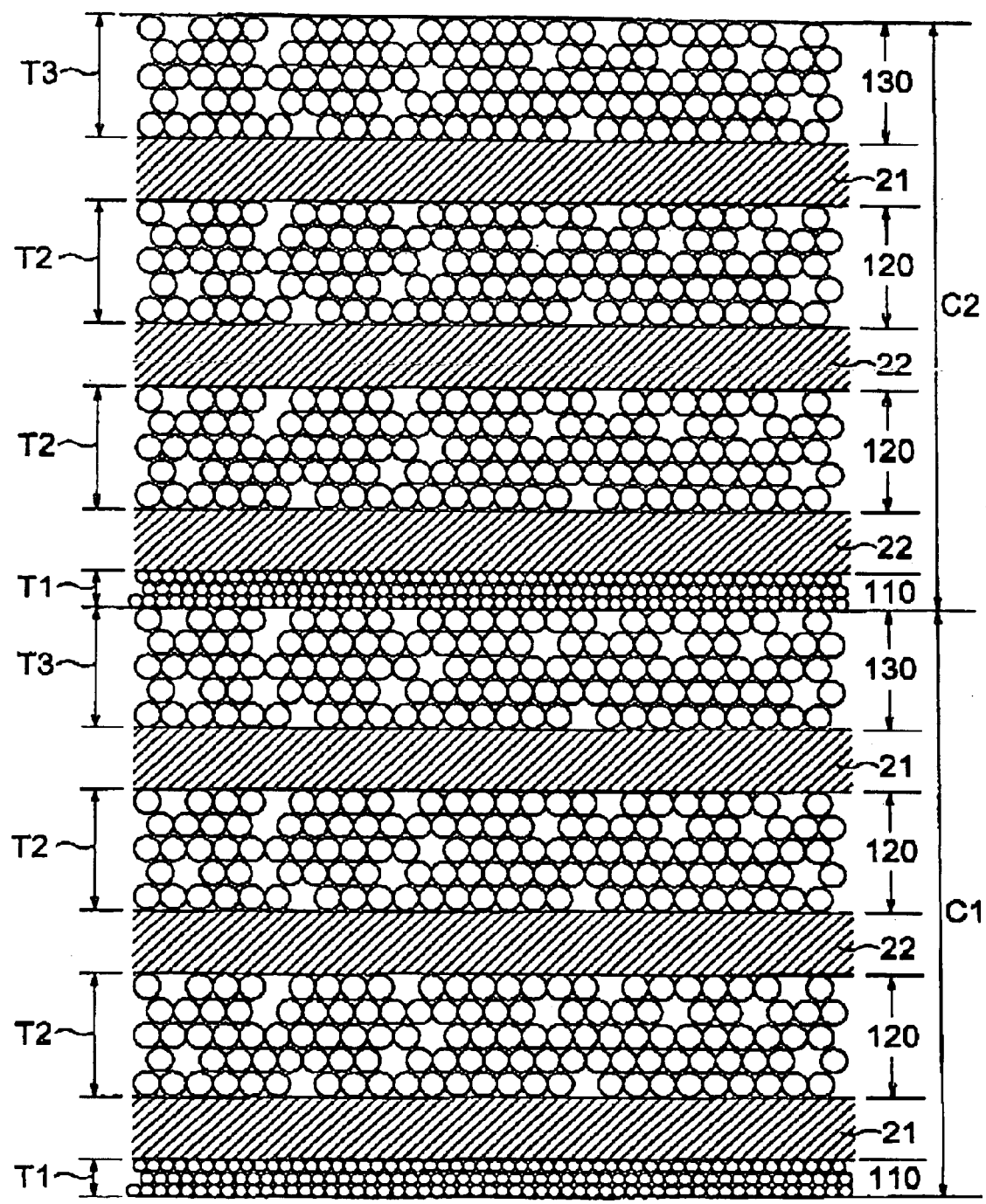
FIG. 16 is an enlarged cross-sectional view of a modification of FIG. 15.

FIG. 16 is an enlarged cross-sectional view schematically showing the internal structure of another example of the multilayer ceramic capacitor shown in FIG. 1. In the figure, components the same as components appearing in FIG. 1 and FIG. 15 are assigned the same reference numerals. This embodiment is characterized by being comprised of a plurality of groups of the second ceramic layer 120 and internal electrodes 21 or 22. In the illustrated embodiment, there are two groups of the second ceramic layer 120 and internal electrodes 22 and 21, but the number can be further increased. In the embodiment shown in FIG. 16 as well, the same actions and effects as the embodiment shown in FIG. 15 are obtained.

Next, the method of production of the multilayer ceramic capacitor according to the embodiment shown in FIG. 15 will be explained, First, as shown in FIG. 3 to FIG. 5, a coating apparatus 5 is used to coat a ceramic coating on the surface of a substrate 6 to form a first ceramic coating layer 110 having a thickness T1 (see FIG. 5). The steps shown in FIG. 3 to FIG. 5 are the same as those of the first embodiment, 80 explanations will be omitted.

Next, after a drying step for drying the first ceramic coating layer 110 and other necessary steps, as shown in FIG. 6 and FIG. 7, internal electrodes 21 and 22 are printed on the surface of the first ceramic coating layer 110. The steps shown in FIG. 6 and FIG. 7 are also similar to those in the first embodiment, so explanations will be omitted.

Next, after a step for drying the internal electrodes etc., as shown in FIG. 8 to FIG. 11, a second ceramic coating layer 120 is formed on the surface of the first ceramic coating layer 110 so as to cover the internal electrodes 21 and 22. The steps shown in FIG. 8 to FIG. 11 are also similar to those in the first embodiment, so explanations will be omitted.

Figure 17:
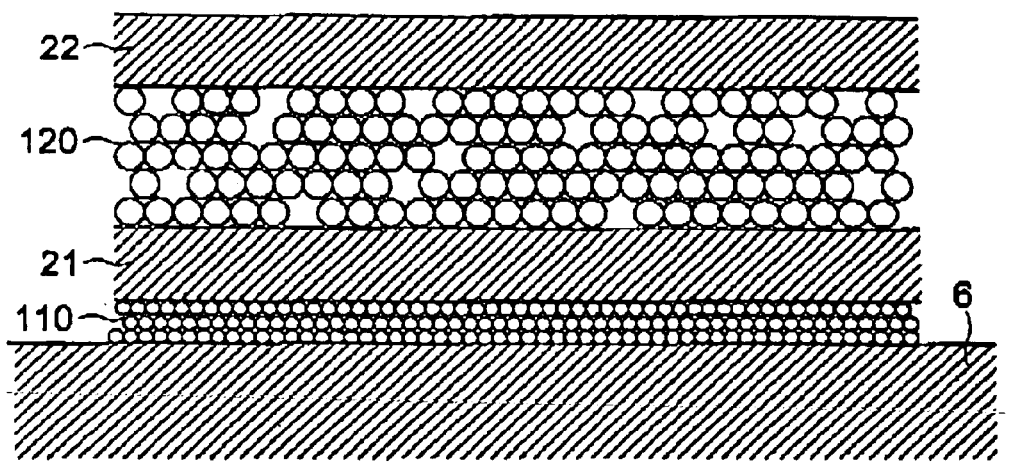
FIG. 17 is a schematic cross-sectional view of a process of production of a multilayer ceramic capacitor shown in FIG. 15.

Next, after a drying step for drying the second ceramic coating layer 120 and other necessary steps, as shown in FIG. 17, internal electrodes 21 and 22 are printed on the surface of the second ceramic coating layer 120. The internal electrode paste for the internal electrodes 21 and 22 is similar to that explained above. FIG. 17 is an enlarged cross-sectional view cut above the internal electrode 21 among the two internal electrodes 21 and 22 formed on the first ceramic coating layer 110.

Figure 18:
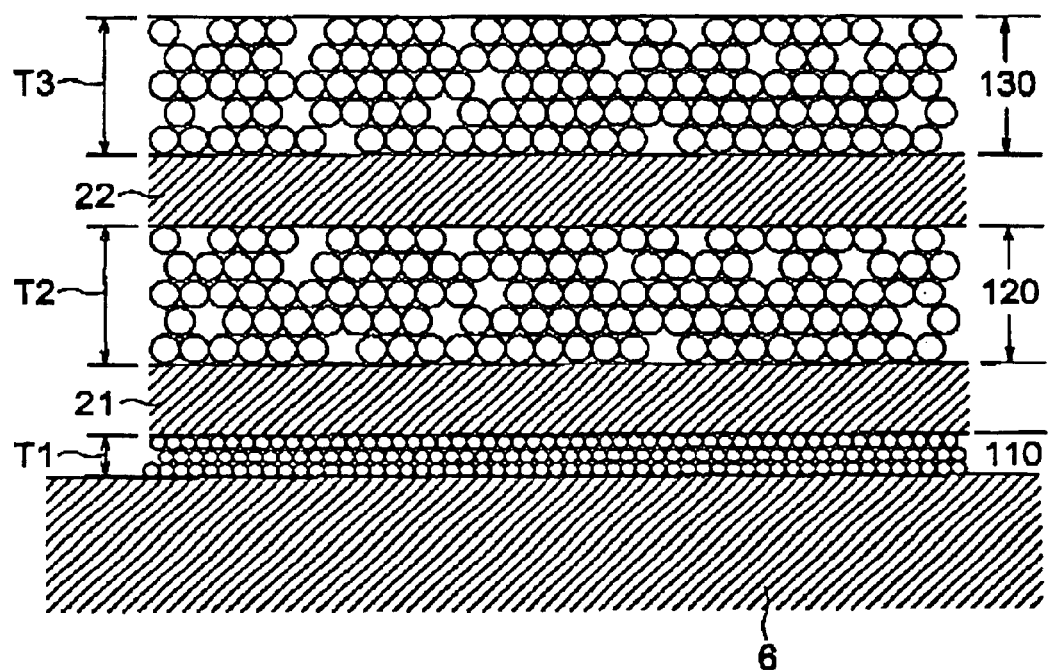
FIG. 18 is a schematic cross-sectional view showing a step after FIG. 17.

Next, after a step for drying the internal electrodes etc., as shown In FIG. 18, a third ceramic coating layer 130 is formed on the surface of the second ceramic coating layer 120 so as to cover the internal electrodes 21 and/or 22. The ceramic coating for forming the third ceramic coating layer 130 may be the same as or different from the ceramic coatings for forming the first and second ceramic coating layers 110 and 120.

As shown in FIG. 16, when using a plurality of groups of the second ceramic layers and internal electrodes, the plurality of groups of the second ceramic coating layers 120 and internal electrodes 22 (or 21) are formed before forming the third ceramic coating layer 130. In practice, it is preferable to form two or three second ceramic coating layers 120 from the viewpoint of eliminating step differences The mean particle size $\alpha 3$ of the ceramic particles included in the ceramic coating forming the third ceramic coating layer 130 is selected to satisfy $\alpha 1 \leq \alpha 3$ with respect to the mean particle size $\alpha 1$ of the ceramic particles including in the ceramic coating for forming the first ceramic coating layer 110. The mean particle size $\alpha 3$ may be same as or different from the mean particle size $\alpha 2$ of the ceramic coating included in the second ceramic coating layer 120.

The third ceramic coating layer 130 is formed to a thickness T3 satisfying T1<T3 with respect to the thickness T1 of the first ceramic coating layer 110. The thickness T3 may be the same as or different from the thickness T2 of the second ceramic coating layer 120.

In the relationship of the third ceramic coating layer 130 to the first ceramic coating layer 110, the condition to be satisfied by the mean particle size $\alpha 3$ with respect to the mean particle size $\alpha 1$ and the condition to be met by the thickness T3 with respect to the thickness T1 are set for similar purposes as the conditions to be satisfied by the mean particle size $\alpha 2$ and thickness T2 of the second ceramic coating layer 120.

As explained above, the first ceramic coating layer 110 and third ceramic coating layer 130 are stacked in contact resulting in a single dielectric layer (ceramic layer) formed between the internal electrodes 21 and 22. Further, the second ceramic coating layer 120 becomes by itself a single dielectric layer (ceramic layer) formed between the internal electrodes 21 and 22.

When producing a small sized and large capacity multilayer ceramic capacity, the total (T1+T3) of the thicknesses T1 and T3 and the thickness T2 should be as small as possible in the ranges able to secure the required withstand voltage. As one example, when obtaining a 100 $\mu$F multilayer ceramic capacitor having a planar shape of 3.2×1.6 mm, the total (T1+T3) of the thicknesses T1 and T2 is preferably not more than 6 μm, more preferably not more than 4 μm. Further, the thickness T2 is also preferably set to not more than 6 μm, more preferably not more than 4 μm. By making the thickness between layers of internal electrodes smaller, it is possible to increase the electrostatic capacity and contribute to a reduction of the overall size. Further, (T1+T3) preferably is substantially equal to T2.

Assuming that the thickness T3 of the third ceramic coating layer 130 satisfies T1<T3 and the thickness T1 becomes smaller than 1.5 μm, the total (T1+T3) of the thicknesses is selected to be kept to not more than 6 μm or within 4 μm.

Figure 19:
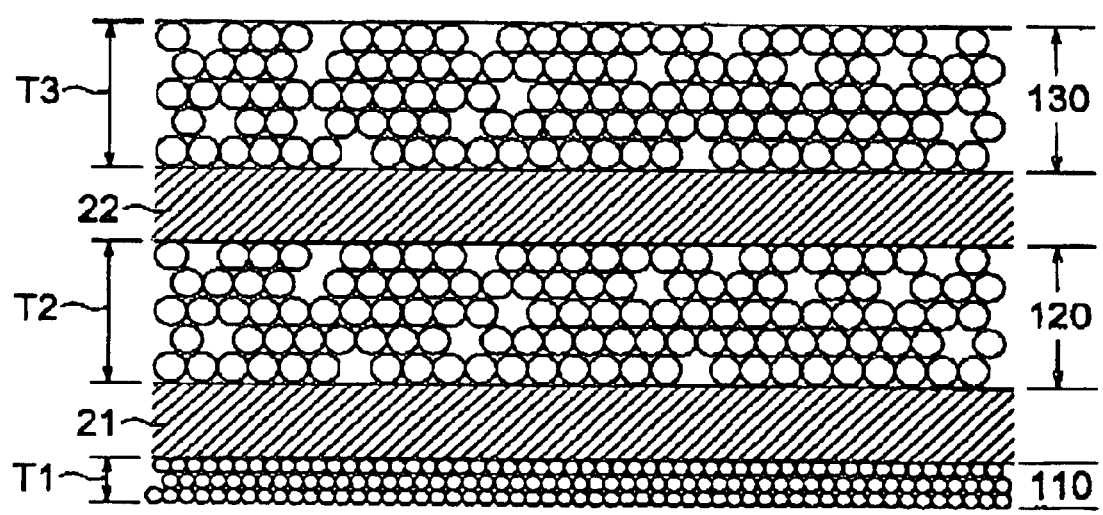
FIG. 19 is a schematic cross-sectional view showing a step after FIG. 197.

Next, after the drying step and other necessary steps, the combined stack of the first ceramic coating layer 110, internal electrodes 21, second ceramic coating layer 120, internal electrodes 22, and third ceramic coating layer 130 is peeled off as a unit from the substrate 6. FIG. 19 shows the stack after being peeled off. While not illustrated, there are also internal electrodes 22 at the surface for formation of the internal electrodes 21 (see FIG. 6), and there are also internal electrodes 21 at the surface for formation of the internal electrodes 22 (see FIG. 6).

In the present embodiment, as explained above, the combined stack of the first ceramic coating layer 110, internal electrodes 21, second ceramic coating layer 120, internal electrodes 22, and third ceramic coating layer 130 is treated as a unit. Further, it is possible to peel off the combined stack integrally as a unit from the substrate 6 (see FIG. 18). Therefore, it is possible to handle these layers as a difficult-to-damage stack and avoid to a great extent delamination, pinholes, withstand voltage defects, and other structural defects due to damage.

Further, since the first ceramic coating layer 110 is formed on the surface of the substrate and then internal electrodes 21 and 22 are printed on the surface of the first ceramic coating layer 110, when peeling these off from the substrate 6, the peeled surface of the first ceramic coating layer 110 becomes a smooth flat surface.

Figure 20:
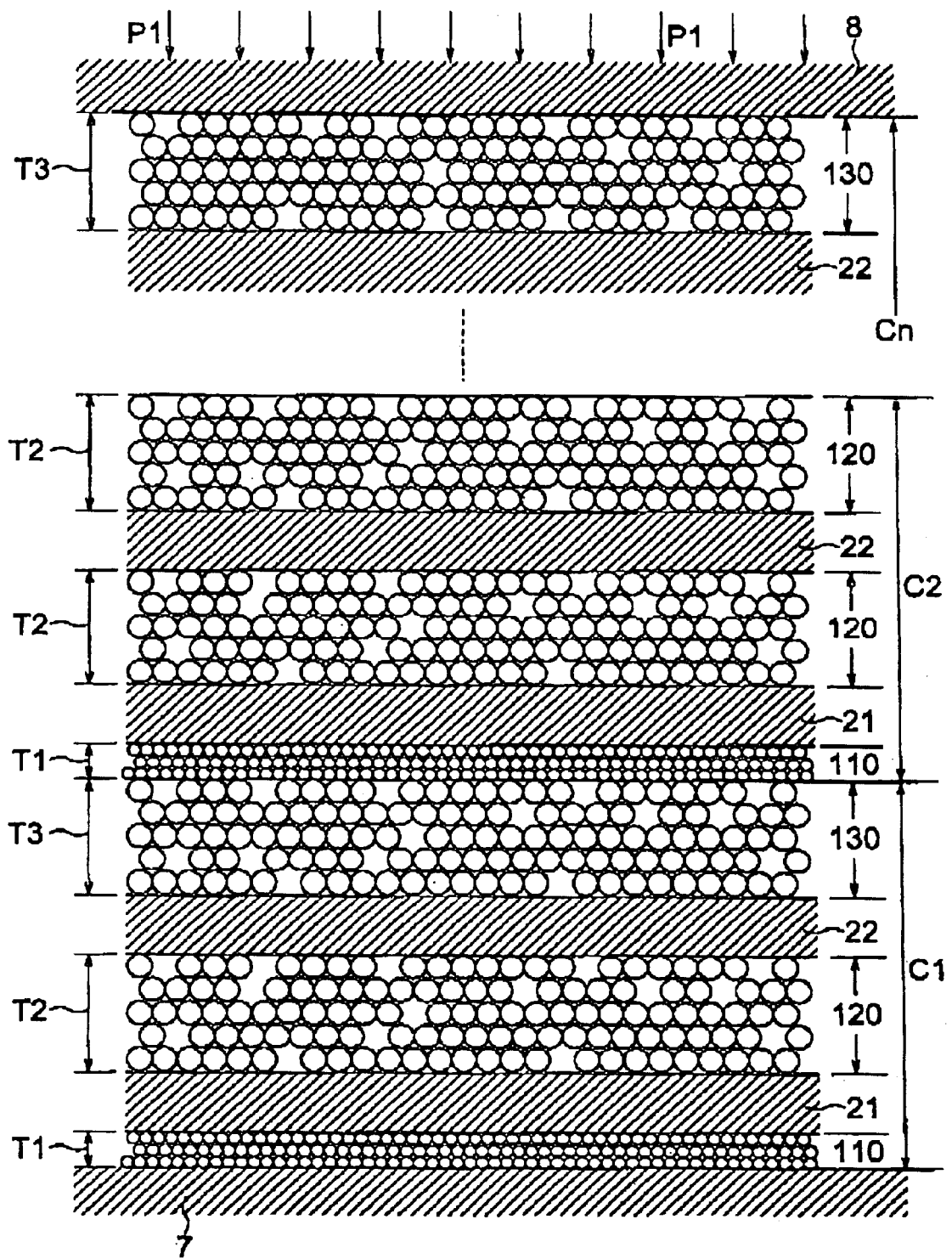
FIG. 20 is a schematic cross-sectional view showing a step after FIG. 19.

Next, the regions GR1 to GR3 of FIG. 6 are punched out. Exactly the necessary number of the punched out stacks C1 to Cn are successively stacked on a table 7 as shown in FIG. 20. In stacking these units, they are successively stacked so that the first ceramic coating layer 110 and third ceramic coating layer 130 adjoin each other between adjoining stacks.

The thus obtained stack, as shown in FIG. 20, is then heat and pressure bonded by a press 8.

Here, the peeled surface of the first ceramic coating layer 110 is a smooth and flat surface. Therefore, by using this smooth peeled surface as the stacking surface, it is possible to avoid delamination, pinholes, withstand voltage defects, and other structural defects due to step differences.

Next, the stack is cut to obtain multilayer green chips. The obtained multilayer green chips are treated under predetermined temperature conditions to remove the binder, then fired and further provided with terminal electrodes by baking.

The conditions for removal of the binder and firing, the formation of the terminal electrodes, and the formation of the plating films are known in the art and are similar to those in the first embodiment, so explanations are omitted.

Next, the effects of the ceramic electronic device according to the present embodiment will be explained with reference to experimental data.

Using the method of production according to the present embodiment, multilayer ceramic capacitors of vertical× horizontal dimensions of 3.2×2.5 (mm) and 100 layers were produced. In the production, the thicknesses T1 to T3 of the first to third ceramic coating layers 110 to 130 were changed and the mean particle sizes α1 to α3 of the ceramic coatings were changed in the range of the present invention to thereby prepare samples of different multilayer ceramic capacitors. The obtained samples of multilayer ceramic capacitors are designated as Examples 21 to 24.

On the other hand, the thicknesses T1 to T3 of the first to third ceramic coating layers 110 to 130 and the mean particle sizes α1 to α3 of the ceramic coatings were changed to be outside the ranges of the present invention so as to prepare samples of different multilayer ceramic capacitors. The obtained samples of multilayer ceramic capacitors are designated as Comparative Examples 21 to 23. Further, a sample according to an example of application of the general method of production of the related art of successively stacking units obtained by coating a ceramic coating layer on the substrate and forming internal electrodes on top is designated as Comparative Example 24.

The above Examples 21 to 24 and Comparative Examples 21 to 24 were measured as to their short-circuit defect rates and withstand voltage defect rates. The methods of measurement are the same as explained for the experiments of the first embodiment, so explanations are omitted here.

The results of measurement of the short-circuit defect rate and withstand voltage defect rate for Examples 21 to 24 and Comparative Examples 21 to 24 are shown together with the thicknesses T1 to T3 and mean particle sizes α1 to α3 of the ceramic coating layers in Table 2.

TABLE 2

|  | First ceramic layer | | Second ceramic layer | | Third ceramic layer | | Short-circuit defect rate (%) | Withstand voltage defect rate (%) |
| --- | --- | --- | --- | --- | --- | --- | --- | --- |
|  | α1 (μm) | T1 (μm) | α2 (μm) | T2 (μm) | α3 (μm) | T3 (μm) |  |  |
| Ex. 21 | 0.35 | 1.0 | 0.35 | 4.0 | 0.35 | 3.0 | 6 | 5 |
| Ex. 22 | 0.20 | 1.0 | 0.35 | 4.0 | 0.35 | 3.0 | 3 | 4 |
| Ex. 23 | 0.20 | 0.6 | 0.35 | 4.0 | 0.35 | 3.4 | 3 | 2 |
| EX. 24 | 0.20 | 1.0 | 0.20 | 4.0 | 0.20 | 3.0 | 1 | 2 |
| Comp. Ex. 21 | 0.35 | *1.5 | 0.35 | 4.0 | 0.35 | 2.5 | 13 | 9 |
| Comp. Ex. 22 | 0.35 | *2.0 | 0.35 | 4.0 | 0.35 | *2.0 | 16 | 11 |
| Comp. Ex. 23 | *0.50 | 1.0 | 0.50 | 4.0 | 0.50 | 3.0 | 47 | 21 |
| Comp. Ex. 24 | 0.35 | *4.0 | — | — | — | — | 40 | 17 |

As shown in Table 2, in Comparative Example 24 of the related art obtained by successively stacking units obtained by coating a ceramic coating layer on a substrate and forming internal electrodes on top, the short-circuit defect rate reached as high as 40% and the withstand voltage defect rate also was a high 17%.

In Comparative Examples 21 to 23 having the first ceramic coating layers and second ceramic coating layers, but having thicknesses T1 and T2 and mean particle sizes α1 and α2 of the ceramic particles not satisfying one of α1≦α2 or α3, 0.5<α1≦0.35 μm and T1<T2 or T3, 0<T1≦1.5 μm the short-circuit defect rates were in the range of 13% to 47% and the withstand voltage defect rates were high values of 9% to 21% as well.

As opposed to this, Examples 21 to 24 according to the present intention, satisfying the above relations, were kept in ranges of short-circuit defect rates of 1% to 6% and ranges of withstand voltage defect rates of 2% to 5%. This shows remarkable superiority over Comparative Examples 21 to 24.

As explained above, according to this embodiment of the present invention, the following effects can be obtained:

(a) It is possible to provide a ceramic electronic device, in particular a multilayer ceramic capacitor, resistant to short-circuit defects, withstand voltage defects, and other structural defects.

(b) It is possible to provide a method of production of a high precision, high reliability ceramic electronic device able to remarkably reduce the difficulty in peeling and probability of occurrence of defects in characteristics of the product even if reducing the thickness of the ceramic coating layers.

(c) It is possible to provide a method of production of a ceramic electronic device remarkably reducing the step differences between layers due to the electrodes and improving the reliability.

While the invention has been described with reference to specific embodiments chosen for purpose of illustration, it should be apparent that numerous modifications could be made thereto by those skilled in the art without departing from the basic concept and scope of the invention.

What is claimed is:

1. A ceramic electronic device, comprising:
   a ceramic body comprised of ceramic layers stacked together and
   a plurality of internal electrodes stacked inside said ceramic body via said ceramic layers, wherein
      at least one of said ceramic layers present between pairs of adjoining internal electrodes is a multilayer structure of a first ceramic layer and a second ceramic layer and,
      when a mean particle size of ceramic particles of said first ceramic layer is $\alpha 1$, a thickness of said first ceramic layer is T1, a mean particle size of ceramic particles of said second ceramic layer is $\alpha 2$, and a thickness of said second ceramic layer is T2, the conditions of $\alpha 1 \leq \alpha 2$, $0.05\ \mu m < \alpha 0.35\ \mu m$, and T1<T2, $0\ \mu m < T1 \leq 1.5$ are satisfied
   wherein some of said ceramic layers present between pairs of adjoining internal electrodes are formed of said first ceramic layer or said second ceramic layer alone.

2. The ceramic electronic device as set forth in claim 1, wherein each of said ceramic layers present between pairs of adjoining internal electrodes is a multilayer structure of the first ceramic layer and the second ceramic layer.

3. The ceramic electrode device as set forth in claim 1, comprising a multilayer ceramic capacitor.

4. A ceramic electronic device comprising:
   a ceramic body comprised of ceramic layers stacked together and
   a plurality of internal electrodes stacked inside said ceramic body via said ceramic layers, wherein
      at least one of said ceramic layers present between pairs of adjoining internal electrodes is a multilayer structure of a first ceramic layer and a third ceramic layer,
      remaining ceramic layers in said ceramic layers present between pairs of adjoining internal electrodes is configured by second ceramic layers alone, and,
      when a mean particle size of ceramic particles of said first ceramic layer is a $\alpha 1$, a thickness of said first ceramic layer is T1, a mean particle size of ceramic particles of said second ceramic layer is $\alpha 2$, a thickness of said second ceramic layer is T2, a mean particle size of ceramic particles of said third ceramic layer is $\alpha 3$, and a thickness of said third ceramic layer is T3, the conditions of $\alpha 1 \leq \alpha 2$, $\alpha 1 \leq \alpha 3$, $0.05\ \mu m < \alpha 1 \leq 0.35\ \mu m$, T1<T2, T1<T3, and $0\ \mu m < T1 < 1.5\ \mu m$ are satisfied, and wherein $T1+T3 \leq 6\ \mu m$.

5. The ceramic electronic device as set forth in claim 4, wherein $T2 \leq 6\ \mu m$.

6. The ceramic electronic device as set forth in claim 4, wherein T1+T3 is substantially equal to T2.

7. The ceramic electronic device as set forth in claim 4, comprising a multilayer ceramic capacitor.

8. The ceramic electronic device as set forth in claim 4, wherein there is at least one ceramic layer comprised only of said second ceramic layer between adjoining pairs of ceramic layers formed by multilayer structures of said first ceramic layer and third ceramic layer.

9. A ceramic electronic device comprising:
   a ceramic body comprised of ceramic layers stacked together and
   a plurality of internal electrodes stacked inside said ceramic body via said ceramic layers, wherein
      at least one of said ceramic layers present between pairs of adjoining internal electrodes is a multilayer structure of a first ceramic layer and a second ceramic layer and,
      when a mean particle size of ceramic particles of said first ceramic layer is $\alpha 1$, a thickness of said first ceramic layer is T1, a mean particle size of ceramic particles of said second ceramic layer is $\alpha 2$, and a thickness of said second ceramic layer is T2, the conditions of $\alpha 1 \leq \alpha 2$, $0.05\ \mu m < \alpha 1 \leq 0.35\ \mu m$, and T1<T2, $0\ \mu m < T1 < 1.5$ are satisfied, and wherein $T1+T2 \leq 6\ \mu m$.

* * * * *